(12) United States Patent
Urban et al.

(10) Patent No.: US 6,266,240 B1
(45) Date of Patent: Jul. 24, 2001

(54) ENCASEMENT FOR A HANDHELD COMPUTER

(75) Inventors: Alan Urban, San Jose; Francis J. Canova, Fremont; Amy A. Han, Palo Alto; E. Michael Lunsford, San Carlos; Madeleine L. Francavilla, Santa Cruz; Jan Musich, Capitola, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/502,169

(22) Filed: Feb. 11, 2000

Related U.S. Application Data

(63) Continuation-in-part of application No. 09/451,630, filed on Nov. 30, 1999, and a continuation-in-part of application No. 09/271,057, filed on Mar. 16, 1999, and a continuation-in-part of application No. 09/244,440, filed on Feb. 4, 1999, and a continuation-in-part of application No. 09/246,781, filed on Feb. 4, 1999, and a continuation-in-part of application No. 09/244,613, filed on Feb. 4, 1999.

(51) Int. Cl.[7] .............................. H05K 5/00; H05K 7/00; G06F 1/16
(52) U.S. Cl. .......................... 361/686; 150/154; 206/472
(58) Field of Search .......................... 150/154; 206/472; 312/223.1–223.2; 345/901; 361/681, 683, 686

(56) References Cited

U.S. PATENT DOCUMENTS

| | | |
|---|---|---|
| D. 366,463 | 1/1996 | Ive et al. ........................ D14/100 |
| D. 368,079 | 3/1996 | Ive et al. ........................ D14/114 |
| 4,559,705 | 12/1985 | Hodge et al. ........................ 33/1 B |
| 5,040,296 | 8/1991 | Yerger ........................ 30/81 |
| 5,049,862 | 9/1991 | Dao et al. ........................ 340/706 |
| 5,128,829 | 7/1992 | Loew ........................ 361/380 |
| 5,165,415 | 11/1992 | Wallace et al. ........................ 128/661.06 |
| 5,205,017 | 4/1993 | Wang ........................ 16/367 |
| 5,253,142 | 10/1993 | Weng ........................ 361/680 |
| 5,430,248 | 7/1995 | Levy ........................ 174/50 |
| 5,489,924 | 2/1996 | Shima et al. ........................ 345/173 |
| 5,548,477 | 8/1996 | Kumar et al. ........................ 361/680 |
| 5,555,157 | * 9/1996 | Moller et al. ........................ 361/683 |
| 5,638,257 | 6/1997 | Kumar et al. ........................ 361/680 |
| 5,810,461 | 9/1998 | Ive et al. ........................ 312/223.6 |
| 5,821,510 | 10/1998 | Cohen et al. ........................ 235/375 |
| 5,831,613 | 11/1998 | Johnston et al. ........................ 345/339 |
| 5,848,298 | * 12/1998 | Steere, Jr. et al. ........................ 395/882 |
| 5,889,512 | 3/1999 | Moller et al. ........................ 345/179 |
| 5,914,708 | 6/1999 | LaGrange et al. ........................ 345/179 |
| 5,996,956 | * 12/1999 | Shawver ........................ 345/173 X |
| 6,032,866 | * 3/2000 | Knighton et al. ........................ 235/492 |
| 6,108,200 | 8/2000 | Fullerton ........................ 361/686 |
| 6,129,430 | * 10/2000 | Wu ........................ 312/223.2 |
| 6,178,087 | 1/2001 | Cho et al. ........................ 361/686 |

\* cited by examiner

*Primary Examiner*—Jeffrey Donels
(74) *Attorney, Agent, or Firm*—Van Mahamedi; Hickman Palermo Truong & Becker LLP

(57) ABSTRACT

An encasement for a handheld computer is provided. The encasement includes a spine that is slideably engageable with an accessory slot of a handheld computer; and an encasement portion joined to the spine. The encasement portion is dimensioned to encase the handheld computer when the spine is engaged to the handheld computer.

26 Claims, 20 Drawing Sheets

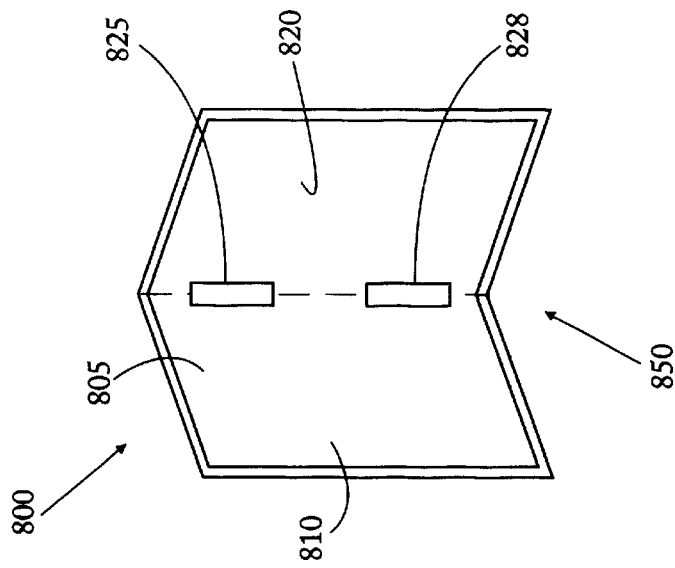
FIGURE 8
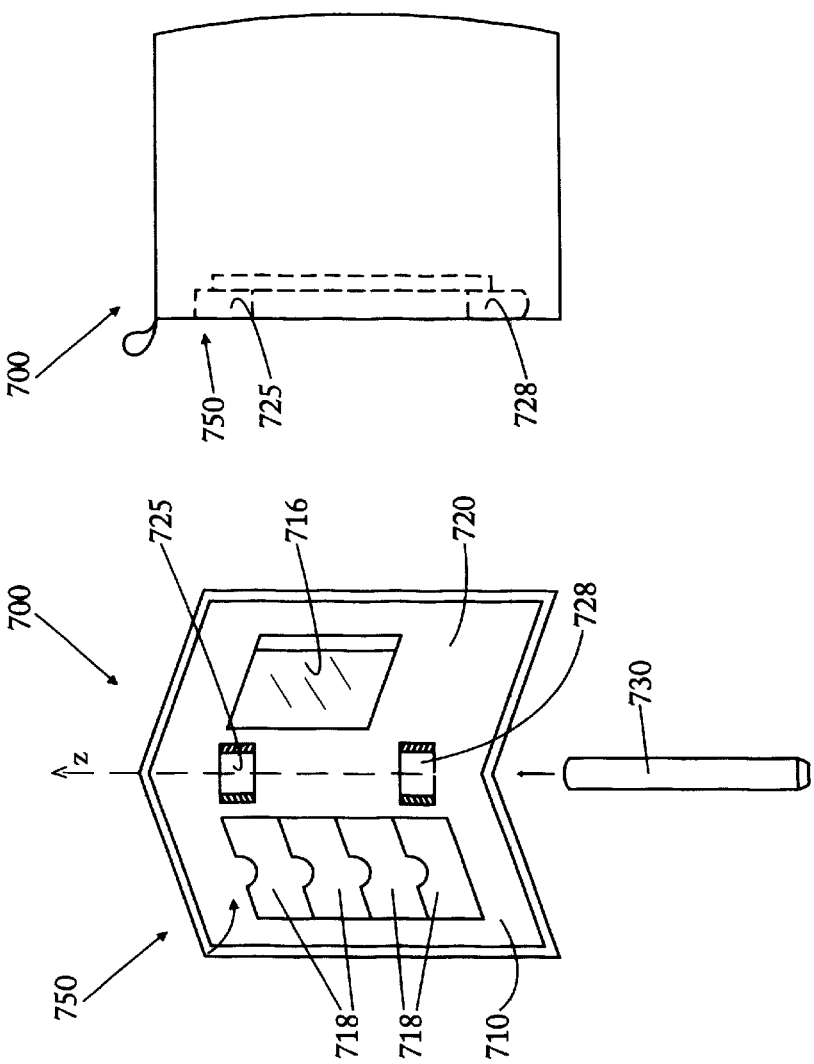
FIGURE 7B
FIGURE 7A

ENCASEMENT FOR A HANDHELD COMPUTER

CROSS REFERENCE TO RELATED APPLICATIONS

This application is a continuation-in-part of application Ser. No. 09/451,630, filed Nov. 30, 1999, entitled "Cover For A Handheld Computer"; application Ser. No. 09/271, 057, filed Mar. 16, 1999, entitled "Dual Action Stylus For A Handheld Computer,"; application Ser. No. 09/244,440, filed Feb. 4, 1999, entitled "Handheld Computer"; application Ser. No. 09/246,781, filed Feb. 4, 1999, entitled "Handheld Computer"; and application Ser. No. 09/244,613, filed Feb. 4, 1999, entitled "Handheld Computer"; all of which are hereby incorporated by reference for this application.

BACKGROUND OF THE INVENTION

1. Field of the Invention

This invention relates to the field of handheld computers. In particular, the invention relates to a cover for a handheld computer.

2. Description of the Related Art

Handheld computers, including personal digital assistants and palm-sized computers, provide the user with a wide variety of functions, such as a calendar, an address book, a task list, a notepad, and a calculator. These handheld computers may be approximately the size of a stack of 3"×5" index cards, sufficiently compact to fit into a shirt pocket.

Current handheld computers, such as the PalmPilot™ from 3Com Corporation, typically have a housing, which consists of a mating front shell and back shell, which are coupled to each other with screws. The front shell and back shell enclose the components of the handheld computer. Typically, a main board is mounted on one of the shells.

The housing or casing of the handheld computer typically includes a slot for a retaining a stylus or writing device.

Handheld computers also typically include a display and one or more application buttons on a front surface. The display may be a touch-screen to accept entry from a stylus or pointer device.

In between uses, handheld computers can be housed in an encasement to protect the device as it is carried between locations. The encasements need to be stored or accounted for separately when the handheld computer is in use, or stored away from the encasement. Also, the handheld computer may beed to be guarded from being dropped when the encasement is opened or separated from the handheld computer.

SUMMARY OF THE INVENTION

An embodiment of the invention includes an encasement for a handheld computer. The encasement includes a spine that engages an accessory slot of the handheld computer. The encasement may be secured to the handheld computer by inserting the spine into the accessory slot of the handheld computer. The encasement portion may be formed from different types of material, including flexible and rigid materials.

BRIEF DESCRIPTION OF THE FIGURES

FIG. 1A is a frontal view of the handheld computer.

FIG. 1B is an exploded isometric view showing components of the handheld computer, under an embodiment of the invention.

FIG. 1C is a top view of the handheld computer illustrating a housing of the handheld computer, under an embodiment of the invention.

FIG. 1D is a side view of the handheld computer illustrating the housing and an accessorial slot under an embodiment of the invention.

FIG. 2A is a frontal view of a first surface of the cover.

FIG. 2B is a frontal view of a second surface of the cover.

FIG. 2C is an isometric view of the cover coupled to the handheld computer.

FIG. 3A shows the cover positioned adjacent a front surface of the handheld computer.

FIG. 3B shows the cover positioned adjacent a back surface of the handheld computer.

FIGS. 7A–7B illustrate an encasement, under an embodiment of the invention.

FIG. 7A is a frontal view of the encasement in the open position, with a separated spine.

FIG. 7B is a side view of the encasement in the closed position.

FIG. 8 illustrates an encasement with an integrated spine, under an embodiment of the invention.

FIG. 9A illustrates a first mechanical coupling for securing an encasement in the closed position, under an embodiment of the invention.

FIG. 9B illustrates a second mechanical coupling for securing an encasement in the closed position, under an embodiment of the invention.

FIG. 10A illustrates a frontal view of the hard-shell encasement in the open position.

FIG. 10B illustrates a rear view of the hard-shell encasement in the open position.

FIG. 10C is an isometric view of the hard-shell encasement, shown retaining a handheld computer in phantom.

FIG. 10D is an isometric view of the encasement in a partially open position.

FIG. 11A illustrates the water-resistant encasement in the open position.

FIG. 11B illustrates the water-resistant encasement in the open position.

FIG. 12A is a front view of hard-shell encasement in a closed position.

FIG. 12B is a top view of the hard-shell encasement in the closed position.

FIG. 12C is a bottom view of the hard-shell encasement.

FIG. 12D is a side-view of the hard-shell encasement in the closed position.

FIG. 12E is a front view of the hard-shell encasement in the open position.

FIG. 12F is a side cut-away of the hard-shell encasement, illustrating a spine and a joint for the encasement under an embodiment of the invention.

DETAILED DESCRIPTION

Embodiments of the invention include an encasement for a handheld computer. A portion of the encasement slideably engages a slot on the handheld computer to removeably attach the encasement to the handheld computer. When attached, an encasement portion can enclose the handheld computer. The encasement may be formed from flexible, rigid, or water-resistant material.

A. System Overview

Figure 1A:
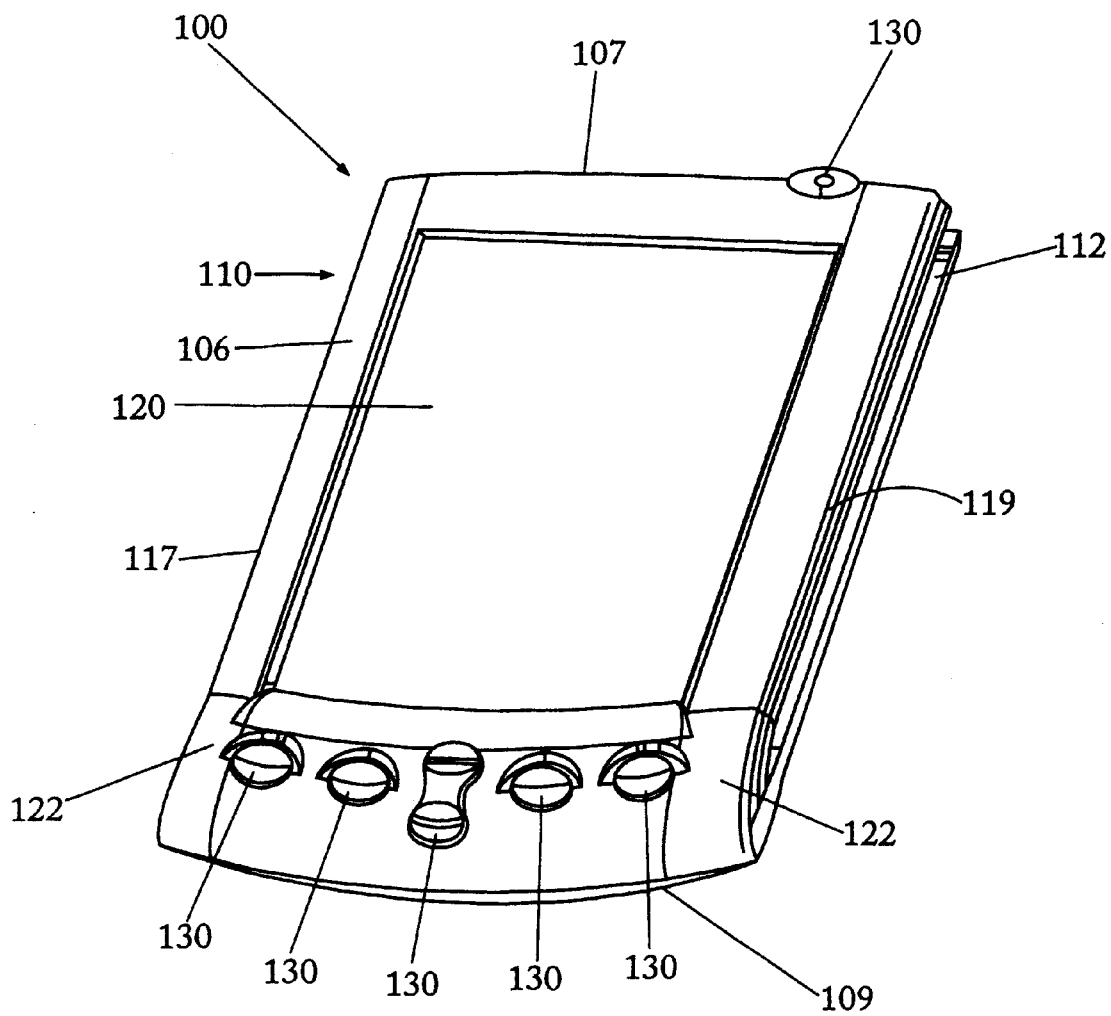
FIGS. 1A–1D illustrate a handheld computer, under an embodiment of the invention.

FIG. 1A is an exploded view of a handheld computer 100 under an embodiment of the invention. A typical handheld computer is used to maintain calendars, to-do lists, contacts and memos. Examples of handheld computers for use with embodiments of this invention include any one of the PalmPilot™, Palm III™, Palm V™, and Palm VII™ organizers, manufactured by the 3Com Corporation. Other embodiments of the invention can include Windows CE™ portable computers, or other handheld computers and personal digital assistants.

The handheld computer 100 includes a housing 110 having a top end 107, a bottom end 109, and lateral sides 117, 119. A user-interactive display 120 is provided on a front side 106 of the handheld computer 100. A plurality of application buttons 130 are accessible through the housing 110 at a portion below the display 120. The housing 100 includes a rectangular shape with a flaired bottom portion 122.

Figure 1B:
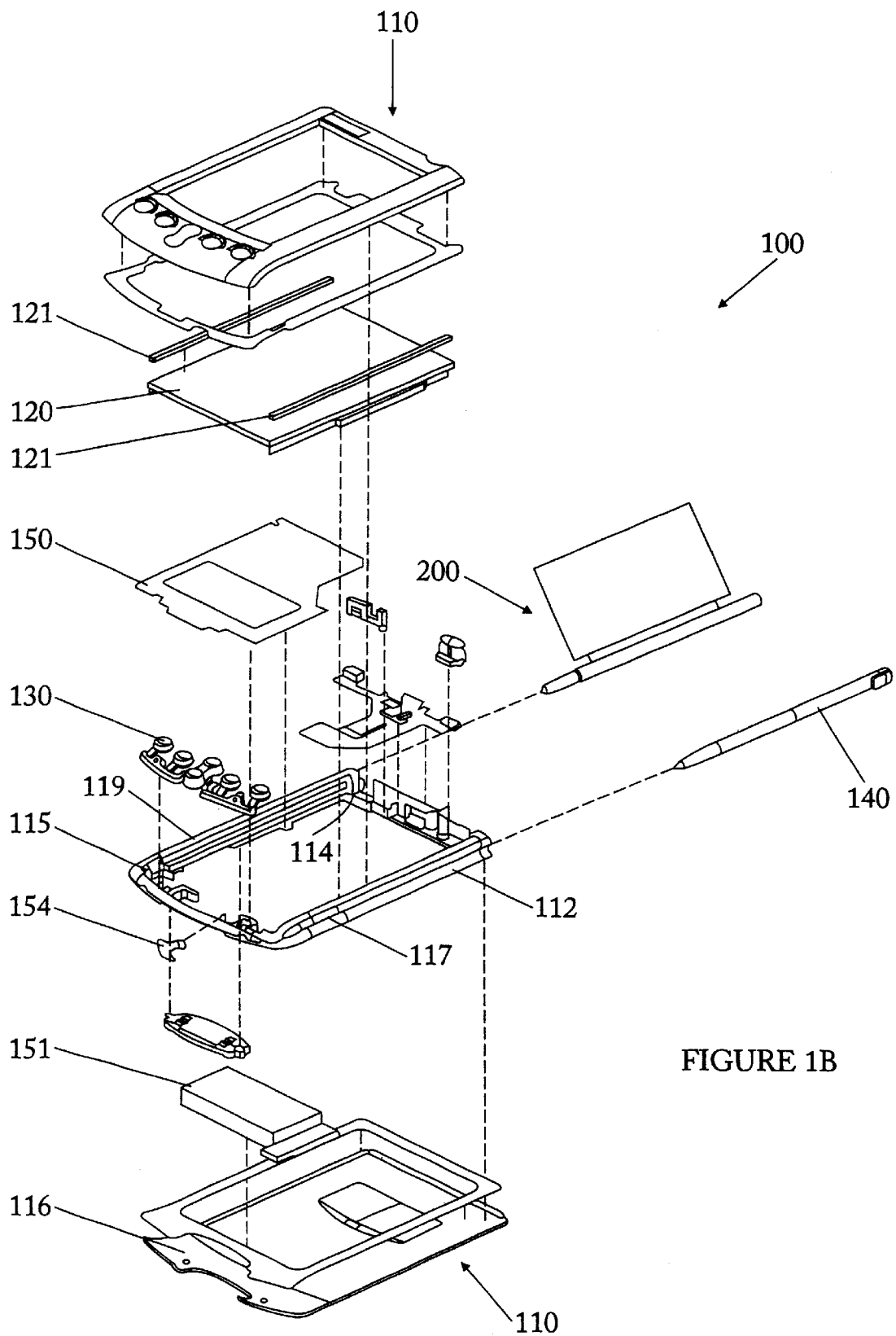
Figure 2A:
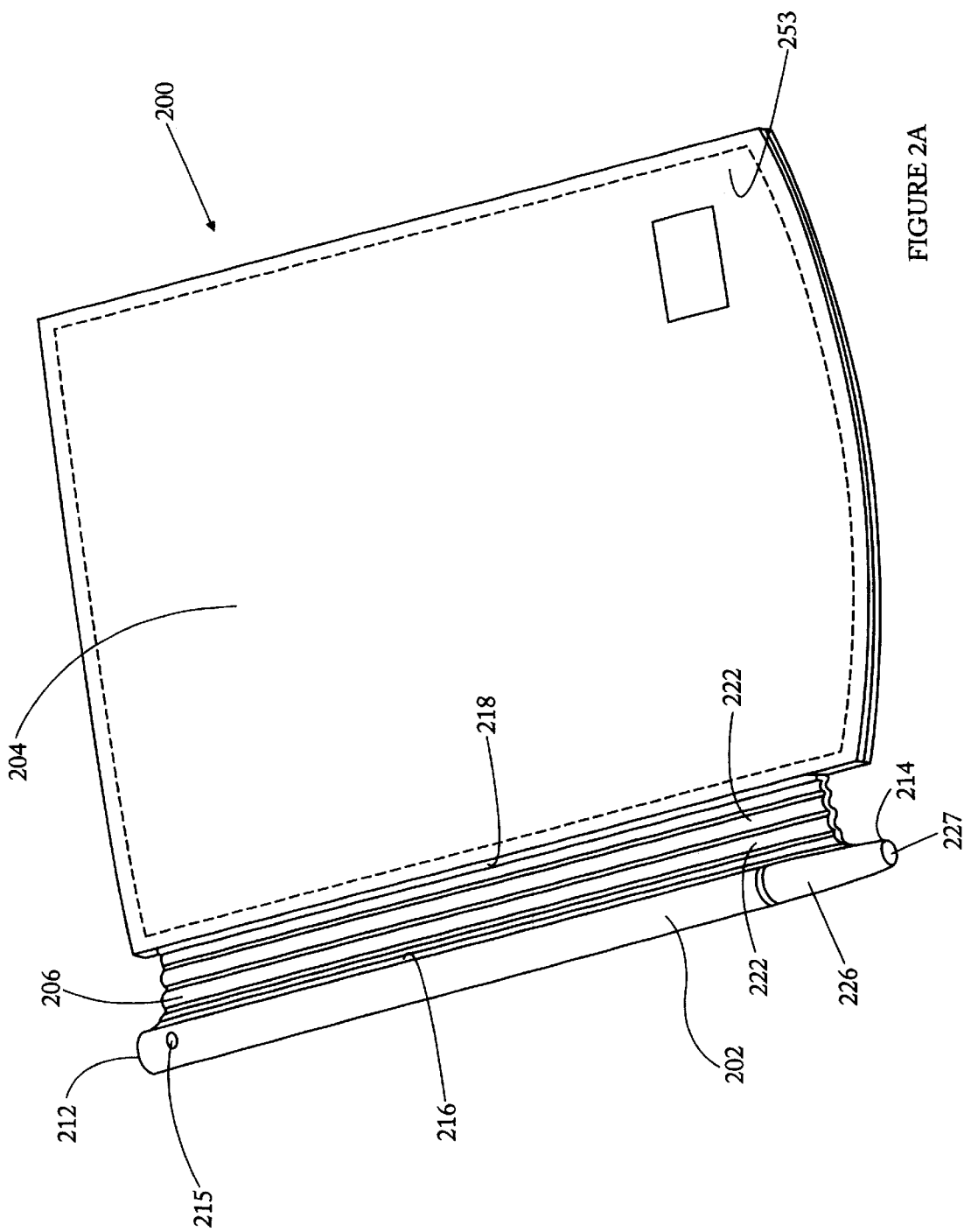
FIGS. 2A–C illustrates a cover, under an embodiment of the invention.

The handheld computer 100 includes one or more accessorial slots. Each accessorial slot is adapted to receive an accessory device. In an embodiment, a first and second accessorial slot 112, 114 (FIG. 1B) are provided on each lateral side 117, 119 of the housing 110. Each accessorial slot 112, 114 may be formed into the midframe 115 (FIG. 1B). Preferably, the accessorial slots 112, 114 are elongated and cylindrical to receive a stylus 140 (FIG. 1B). Each of the accessorial slots 112, 114 may retain stylus 140 for intermittent use with the handheld computer 100. As will be further described, one of the accessorial slots 112, 114 is also used under an embodiment to receive and retain a peripheral portion of the cover 200 (FIG. 2A).

FIG. 1B is an exploded isometric view of the handheld computer 100. The housing 110 includes a midframe 115 sandwiched between a front shell 113 and a back shell 116. The front shell 113, back shell 116, and one or more surfaces of midframe 115 combine to form a periphery of handheld computer 100. Midframe 115 may be molded or otherwise formed to match dimensions of front shell 113 and back shell 116. Midframe 115 may be partially enclosed by one or both of front shell 114 and back shell 116. The front shell 113, back shell 116 and midframe 115 combine to enclose and protect the internal components of the handheld computer 100. Midframe 115, front shell 113, and back shell 116 are coupled together using one or a combination of screws, hinges, clips, other suitable fasteners, and adhesives.

The housing 110 retains componentry of the handheld computer 100. The componentry includes a main board 150, battery 151, a flexible circuit 152, and an electrostatic discharge device 154. Display 120 may be separated from housing 110 by one or more gaskets 121. Gaskets 121 absorb shock and allow a close fit between housing 110 and display 120. If display 120 is a touch-sensitive display, gaskets 121 also act as a spacer to prevent housing 110 from inadvertently activating the touch-sensitive display.

Figure 1C:
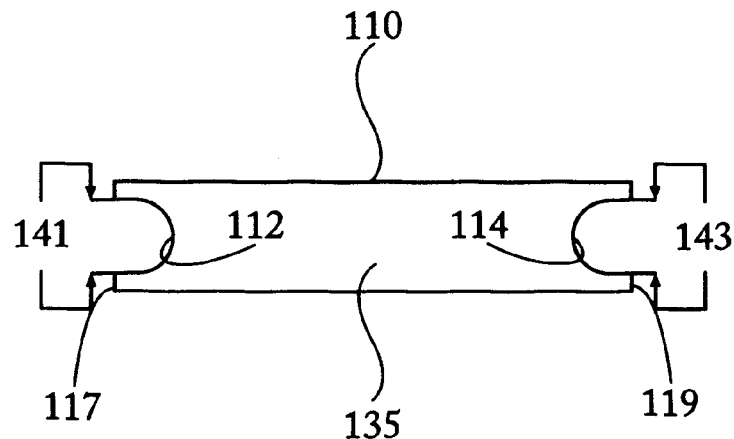

FIG. 1C illustrates a top view of the handheld computer 100. Housing 110 includes a top surface 135 having openings to the accessorial slots 112, 114. The accessorial slots 112, 114 are positioned adjacent a periphery of the housing, and preferably at the left and right lateral sides 117, 119. Each accessorial slot 112, 114 includes an open segment 141, 143 formed into the housing 110 that extends the length of the respective accessorial slot. Each open segment 141, 143 is a void formed in the housing along an arclength portion of a periphery for the respective accessorial slot 112, 114. Each open segment 141, 143 also extends lengthwise along the respective accessorial slot 112, 114 from the top end 107 to the bottom end 109 of the handheld computer. Therefore, the open segments 141, 143 of the respective accessorial slots 112, 114 access a length-wise surface of an accessorial device retained in the respective accessorial slot. Structures may be extended from or attached to the device inserted into one of the accessorial slots 112, 114 along the length accessible through the corresponding open segment 141, 143.

In this manner, accessorial slots 112, 114 allow for accessory devices such as covers 200 (FIG. 2A) to include a peripheral portion that slideably engages and couples to handheld computer 100 so as to retain structures such as a cover panel 204 (FIG. 2A). Cover panels can extend from the peripheral portions to cover surfaces on the handheld computer 100, including the display 120 and the application buttons 130. Further, the use of two or more accessorial slots 112, 114 enables the handheld computer 100 to retain an accessory device such as the cover 200 simultaneously with stylus 140.

Figure 1D:
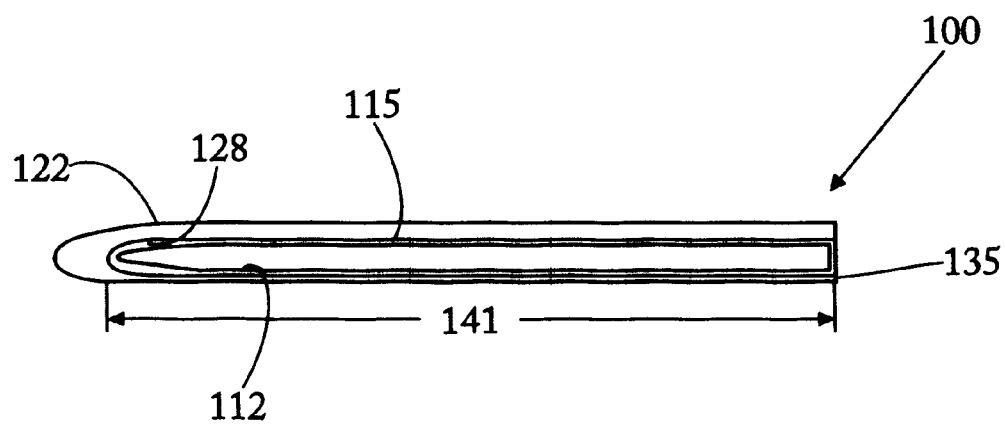

FIG. 1D is a length-wise view of one of the accessorial slot 112, 114 on the respective lateral side of the handheld computer 100. Accessorial slot 112 extends from an opening on the top surface 135 to the bottom portion 122. The accessorial slot 112 is preferably formed into the midframe 115 and includes a narrowing structure 128 positioned within or near the bottom portion 122. The narrowing structure 128 receives a tapered section of the device being inserted, which may include the stylus 140, the cover 200, or another accessory device. The open segment 141 extend the length of the accessorial slot 112.

FIG. 2A is a frontal view of a cover 200, under an embodiment of the invention. The cover 200 includes a peripheral portion that slideably engages an opening, slot or rail of the handheld computer 100. In an embodiment such as shown by FIGS. 1A–1D, the cover 200 is slideably coupled to either one of the accessorial slots 112, 114. The cover 200 includes a cover face 204 that extends from the peripheral portion. The cover face 204 protects features of the handheld computer 100 when the peripheral portion is engaged with the opening of the handheld computer 100.

In an embodiment, peripheral portion of cover 200 includes a spine 202. The cover face 204 extends from the spine 202 so as to cover a surface on the handheld computer 100. A flex member 206 connects spine 102 to cover face 204. The cover face 204 is moveable about an axis of the spine 202 so as to move between a position adjacent the front surface 106 and a back surface 108 of the handheld computer 200.

Spine 202 is dimensioned to be received and retained by a slot or opening in the housing 110 of the handheld computer 100. Preferably, spine 202 is an elongate member having length and cross-section to be received and retained by one of the accessorial slots 112, 114. Spine 202 includes a cylindrical cross-section having a top end 212 and a bottom end 214. A tapered segment 226 is adjacent bottom end 214. The spine 202 is inserted into one of the accessorial slots 112, 114 with the bottom end 214 first.

The tapered segment 226 of spine 202 combines with the narrowing structure 128 (FIG. 1D) of the accessorial slots 112, 114 to facilitate retention of spine 202. A protrusion 215 extends from spine 202 near top end 212. The protrusion 215 is exposed when spine 202 is inserted into the slot of the handheld computer 100 so as to enable the spine 202 to be directed out of the accessorial slot 112, 114 from the top end 212. Movement of spine 202 traverses a single longitudinal axis of the accessorial slots 112, 114 to attach the cover to and detach the cover from the handheld computer 100.

In an embodiment, spine 202 is rotationally fixed when inserted into one of the accessorial slots 112, 114. The cross-section of spine 202 may be dimensioned so that rotational movement of the spine is precluded within either one of the accessorial slot 112, 114. In another embodiment, spine 202 is rotationally moveable within the accessorial slot 112, 114. The rotation of the spine 202 may be limited to the arclength portion of the open segment 141, 143 for the accessorial slot 212, 214 receiving the spine 202.

Preferably, the spine 202 is dimensioned and contoured to be interchangeable with the stylus 140. An endpoint 227 tapered segment 226 may be structured to double as a stylus to enter input into the display 120. A stylus point may be included on the spine 202 to provide a contact with display 120 (FIG. 1A).

Flex member 206 includes a first end surface 216 extending from the spine 202 and a second end surface 218 that is attached to the cover panel 204. In an embodiment, flex member 206 extends from a length of spine 202 that is accessible through the open segment 141, 143 of the respective accessorial slots 112, 114.

Flex member 206 includes flexure properties to enable the first end surface 216 to be moved about the second end surface 218. In addition, a distance between first end surface 216 and second end surface 218 may provide a slack length to further enable movement of the second end surface 218 about the first end surface 216. Preferably, flex member 206 is formed from a plurality of segments 222 that combine to enable the first and second end surfaces 216, 218 to move about one another. The slack length and flexure properties of flex member 206 combine to permit arcuate or radial movement of either the first or second end surface 216, 218 about the other end surface.

Figure 2B:
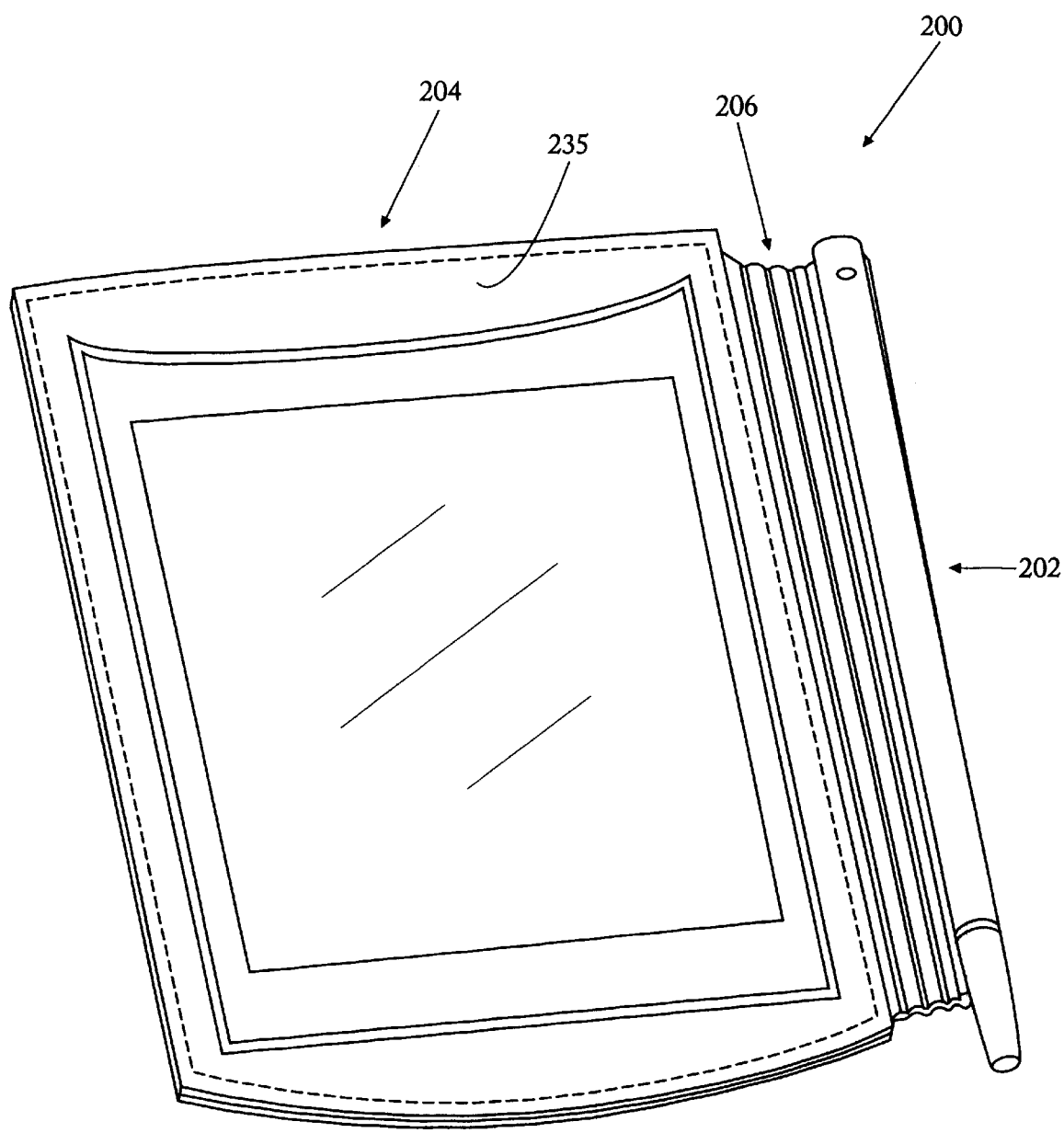

The cover panel 204 includes a first face 233 and a second face 235 (FIG. 2B). Preferably, cover panel 204 is dimensioned to cover a dimension including the display 120 (FIG. 1A) and the application buttons 130. In this way, cover panel 204 prevents inadvertent entry into the handheld computer 100 through either the display 120 or the application buttons 130. Further, components and displays of the handheld computer 200 are protected from dust, dirt, scratching, or contact.

FIG. 2B shows the second face 235 of the cover panel 204. In one embodiment, the second face 235 includes a pocket 255 to retain relatively flat items such as business cards or credit cards. The pocket 255 of the cover panel 204 is preferably formed from clear plastic portion 256 that is stitched to the second surface. Alternatively, the pocket 255 may be a unitary feature of the cover panel 204. The pocket 255 may also be joined to the second face 235 with Velcro or other detachable coupling mechanisms.

In another embodiment, the second face 235 of the cover panel 204 mirrors the first face 233. This enables cover panel 204 to be insertable into either the accessorial sots 112, 114, with the appearance of the cover panel 204 being the same in either position.

Figure 2C:
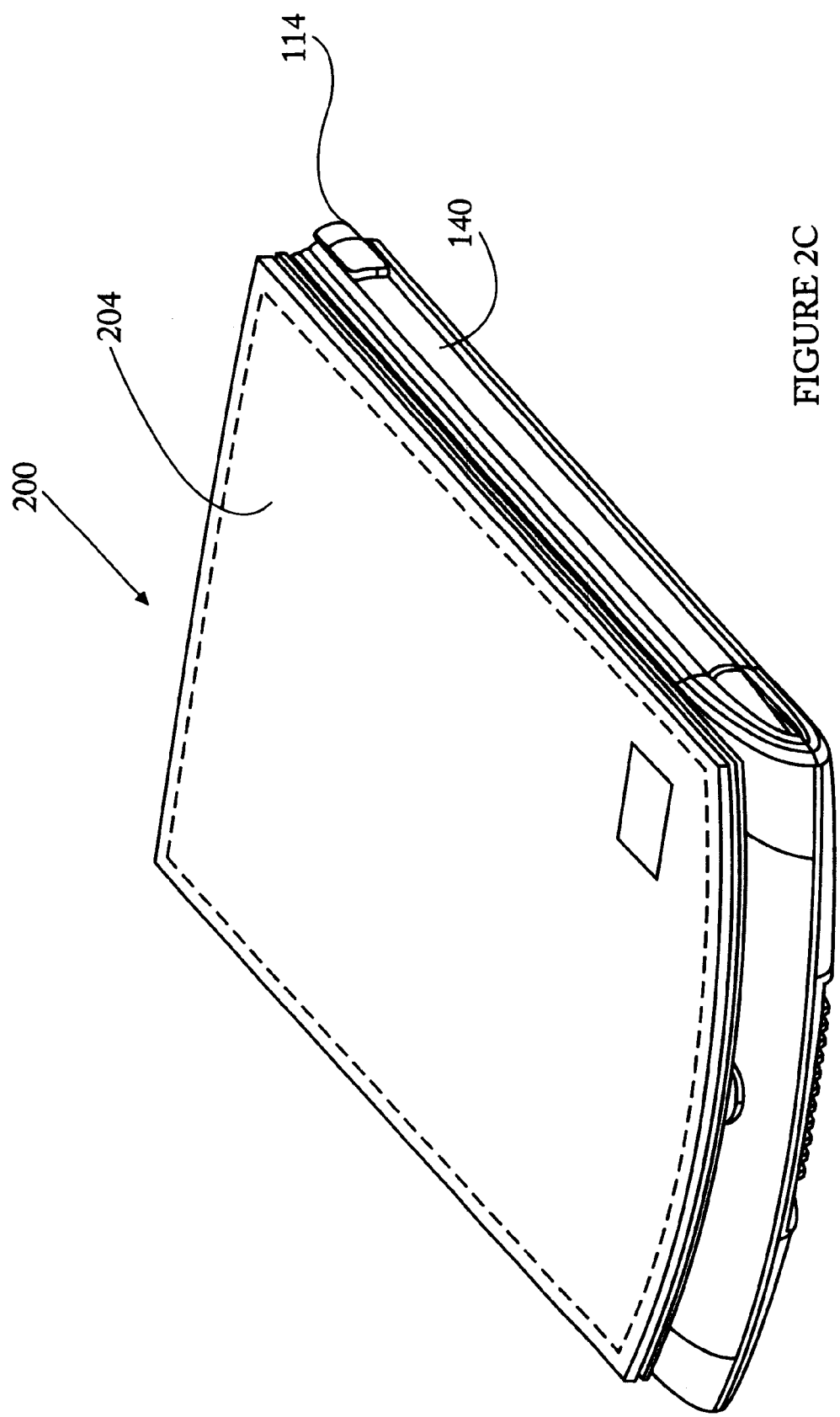

FIG. 2C illustrates the cover 200 in a position where cover face 204 is adjacent the front surface 116 of the handheld computer 100. The cover 200 is engaged with one of the accessorial slots 112 (not shown in this figure), and the stylus 140 is engaged with the other accessorial slot 114. In an embodiment, the cover face 204 is dimensioned so as to match almost the dimensions and contours of the front surface 106. A bottom region of the handheld computer 100 may be uncovered so as to facilitate removal of the cover face 204 from adjacent the front surface 116. The enables the cover 200 to be carried with the spine 202 with the feel of being substantially one unit.

Figure 3A:
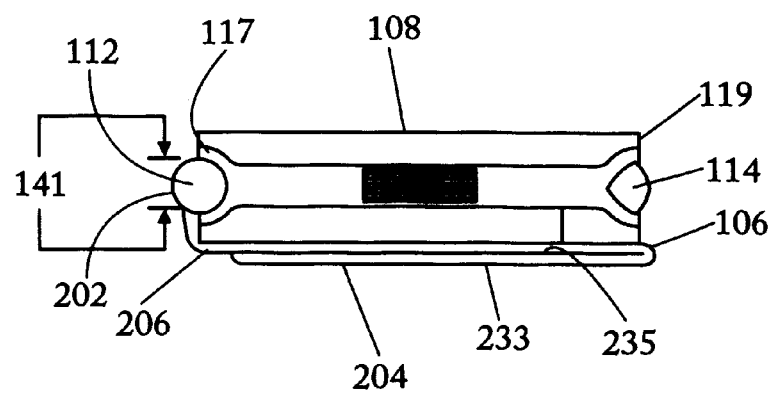
FIGS. 3A and 3B illustrate a top view of the handheld computer coupled to the cover, under an embodiment of the invention.

FIG. 3A is a top end view showing cover 200 slideably engaged with the handheld computer 100. Spine 202 is inserted into accessorial slots 112 positioned at lateral sides 117 of the housing 110. Housing 110 includes the front surface 116 including display 120 (FIG. 1A) and applications buttons 130 (FIG. 1B), and a back surface 108.

In an embodiment, a portion of spine 202 is accessible through the open length 141 of accessorial slot 112. The flex member 206 is joined to a portion of spine 202 accessible through accessorial slot 112. When inserted, spine 202 is oriented relative to the accessorial slot 112 so that flex member 206 extends out of open length 141 in housing 110. Cover panel 204 is extended from the second end surface 218 of the flex member 206 so as to cover a lateral dimension of the handheld computer 100. When positioned adjacent the front surface 116 of the handheld computer 100, the first face 233 is exposed and the second face 235 is positioned interior and immediately adjacent to the front surface 116 of the handheld computer 100. The slack length of the flex member 206 enables the cover panel 204 to move parallel with respect to the first surface of the cover 200.

Figure 3B:
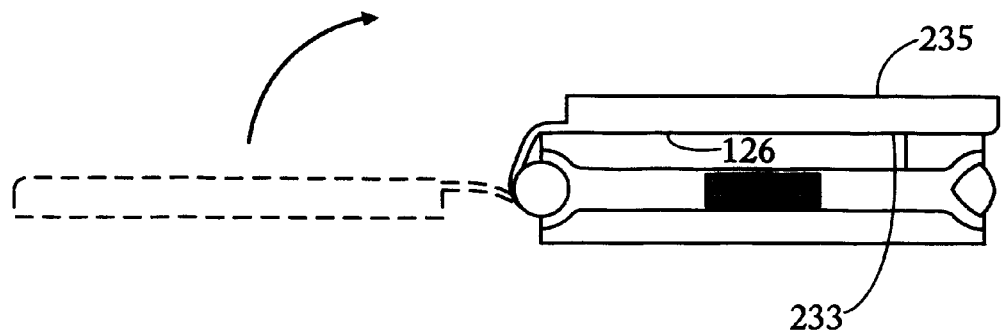

In addition, slack length and flexure properties of flex member 206 enable the cover panel 204 to be moveable about an axis of the spine 202. FIG. 3B illustrates flex member 206 as being moveable between positions adjacent either the front surface 116 or a back surface 108 of the handheld computer 100. Flex member 206 may be extended away from the front or back surface 106, 108 of the handheld computer 100 so that cover panel 204 and flex member 206 are fully extended.

The cover panel 204 may be flipped to be adjacent the back side 108 of the housing 100. In an embodiment, spine 202 remains fixed in the accessorial slot 112, 114, while the slack length of the flex member 206 enables cover panel 204 to be flipped to be adjacent the back surface 108 of the handheld computer 100. When adjacent the back surface 126, the second face 235 of the cover panel is exterior and the first face 233 is interior. In one embodiment, the cover panel 204 may be flipped to be adjacent the back surface 108 so as to expose the pocket 255 that includes business cards or credit cards.

In another embodiment, both faces 233, 235 of cover face 204 are suited to be exterior or otherwise distal to the front surface 106 (or back surface 108) of the handheld computer 100. Thus, in this embodiment, second face 235 may not include pocket 255. Both first and second surface 233 and 235 may be smooth, or mirrored in appearance to display the same features in the same orientation, or symmetrical to one another. Spine 202 may then be inserted into either left or right accessorial slot 112, 114, at the choosing of a user of the handheld computer 100. For example, when inserted into the left accessorial slot 112, the surface 233 of the cover face 206 extends over the front surface 106. When inserted into the second accessorial slot 114, the surface 235 of the cover face 206 extends over the front surface 106. In either case, the appearance of the cover face 204 is the same to the user.

In this embodiment, the length of the flex member 206 is sufficient to extend either one of the faces 233, 235 of the cover face 204 over the front side 106 (or the back side 108) of the handheld computer 100, depending on whether the spine is inserted into the first or second accessorial slot 112, 114.

In another embodiment, spine 202 is shaped to be received by at least one of the accessorial slots 112, 114 via top end 212 or bottom end 214 first. This allows spine 202 to be inserted into first and second accessorial slot 112, 114 so as to extend the same face 233, 235 of the cover face 204 over the front surface 106 (or back surface 108) of the handheld computer 100.

B. Materials, Manufacturing of Cover Panel

In an embodiment, spine 202 is rigid. Preferably, spine 202 is formed from a combination of rubber and plastic. In a specific embodiment, spine 202 is formed from plastic molded with rubber in a double-shot manufacturing process. Spine 202 may be provided with a plastic shell filled with rubber/plastic material, formed either in the same or subsequent manufacturing steps.

In other embodiments, spine 202 is formed from rigid materials such as metals, including steel, brass, tin, or aluminum. The flex member 206 may be attached to the spine 202 through adhesives. Spine 202 may also be attached through other means, such as by passing spine 202 through a closed-loop portion of flex member 206.

In an embodiment, flex member 206 is formed from the same material as spine 202. Preferably, flex member 206 is also formed during the same manufacturing process as spine 202. Flex member 206 may be formed from the same double-shot manufacturing process in which plastic is molded with rubber to form the structure including the spine 202 and the flex member 206. Thus, flex member 206 may be unitarily constructed with spine 202. The segments 222 of the flex member 206 may be rigid, but in combination provide flexure between the first and second end surfaces 216, 218 of the flex member 206. Alternatively, spine 202 may be attached or otherwise integrated to spine 202.

In an embodiment, cover panel 204 is formed from deformable materials. In an application, the cover panel 204 is formed from leather, or leather material, such as rawhide, soft leather, and suede. The cover panel 204 may alternatively be formed from fabric, vinyl, plastic, or rubber. Fabric includes cloth, velvet, tweed, and polyester. Examples of materials listed herein are intended to be exemplary, and not limiting. The cover panel 204 may also be formed from a combination of two or more materials, such as leather and plastic.

The cover panel 204 is preferably stitched to the flex member 206. Alternatively, cover panel 204 is glued or secured through other coupling means to the flex member 206.

C. Alternative Embodiments for Cover of Handheld Computer

Figure 4:
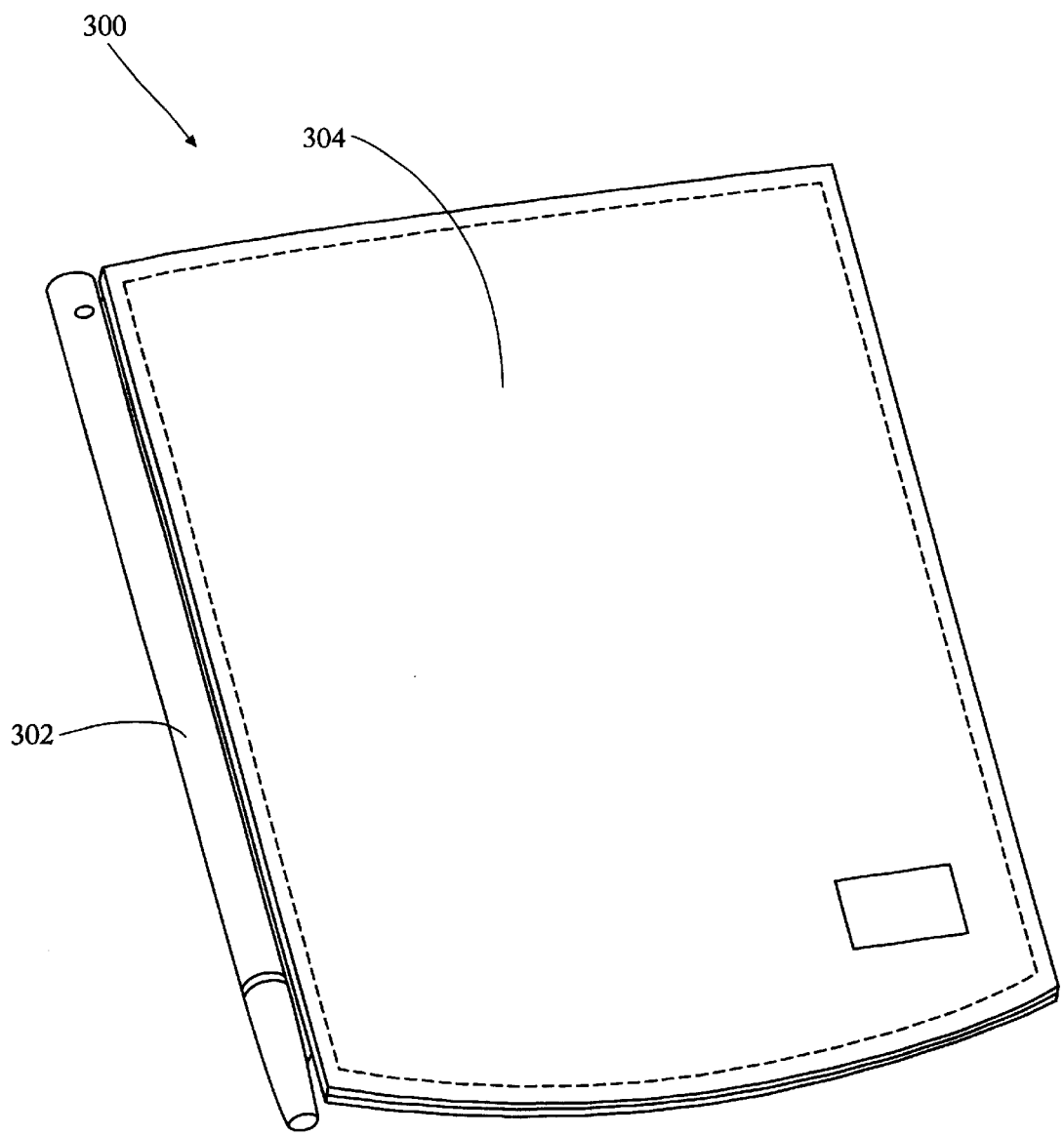
FIG. 4 is a frontal view of a cover, under another embodiment of the invention.

FIG. 4 illustrates a cover 300 under an embodiment of the invention. The cover 300 includes a spine 302 and a cover panel 304. The cover panel 304 is connected to the spine 202. The spine 302 may be slideably coupled to a handheld computer. In an embodiment such as shown by FIGS. 1A–1D, the spine 302 slideably inserts into either accessorial slot 112, 114. The spine 302 is rotatable when inserted in the accessorial slot 112, 114 so that the cover panel 304 is rotational about an axis of the accessorial slot 112, 114.

In this embodiment, spine 302 may be formed from rigid materials such as plastic, rubber, plastic molded with rubber, steel, aluminum, and brass. Cover panel 304 may be formed from deformable materials such as leather, plastic, vinyl, rubber, or fabric.

The spine 302 may be attached to cover panel 302 by looping an end surface 307 at two or more locations to form a seam. Adhesives, or other coupling means such as stitches may be used to loop the end surface 307 of the cover 300. The spine 302 may be inserted through the seam to attach to the cover pane 304.

Figure 5:
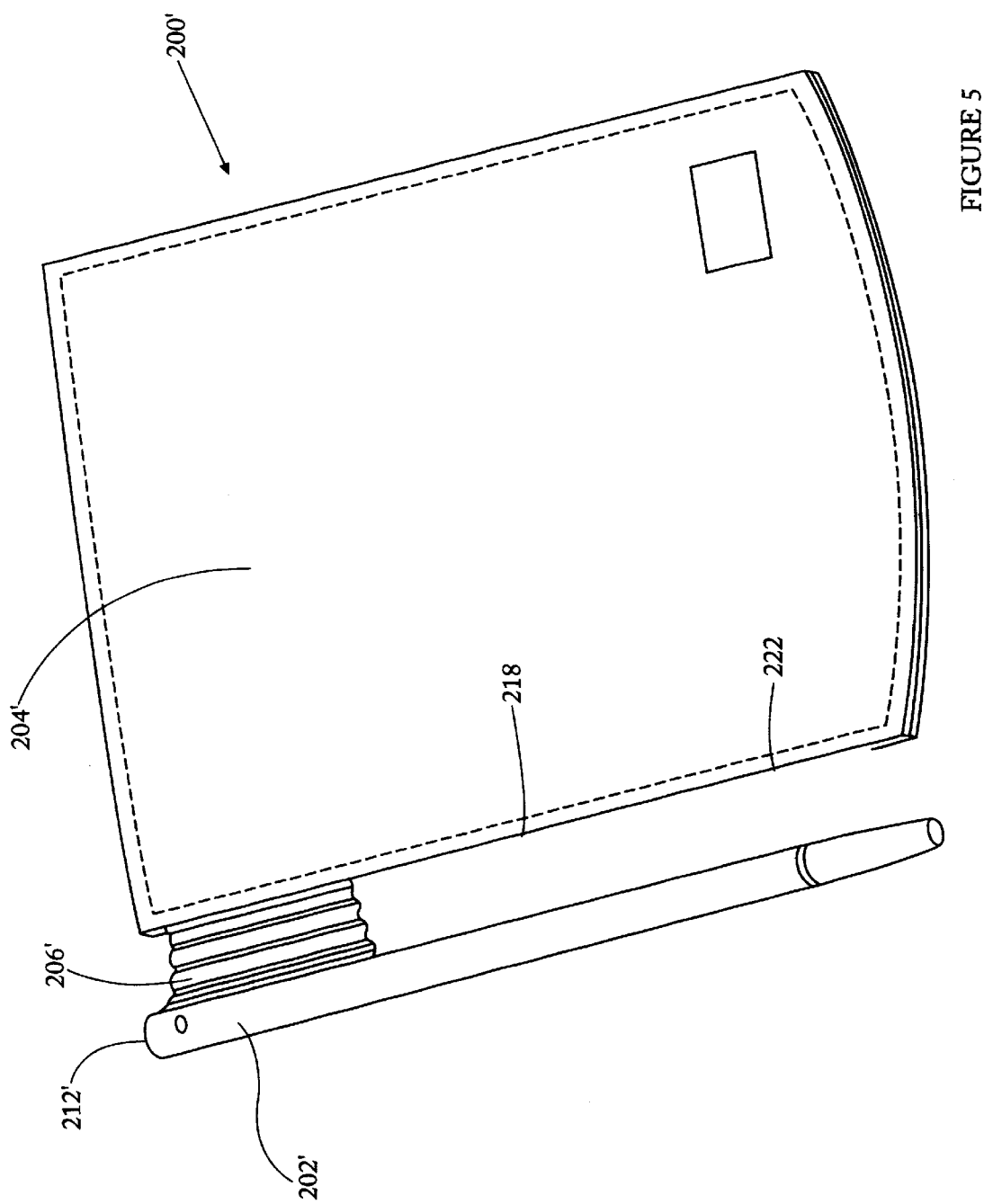
FIG. 5 is a frontal view of a cover, under still another embodiment of the invention.

FIG. 5 illustrates the cover 200 under an embodiment in which the flex member 206' is relatively short in comparison to a length of spine 202'. Preferably, flex member 206' is positioned near or adjacent to top end 212' of spine 202'. This enables cover 200' to be inserted into one of the accessorial slots 112', 114' having short open lengths to access the flex member 206'.

Figure 6:
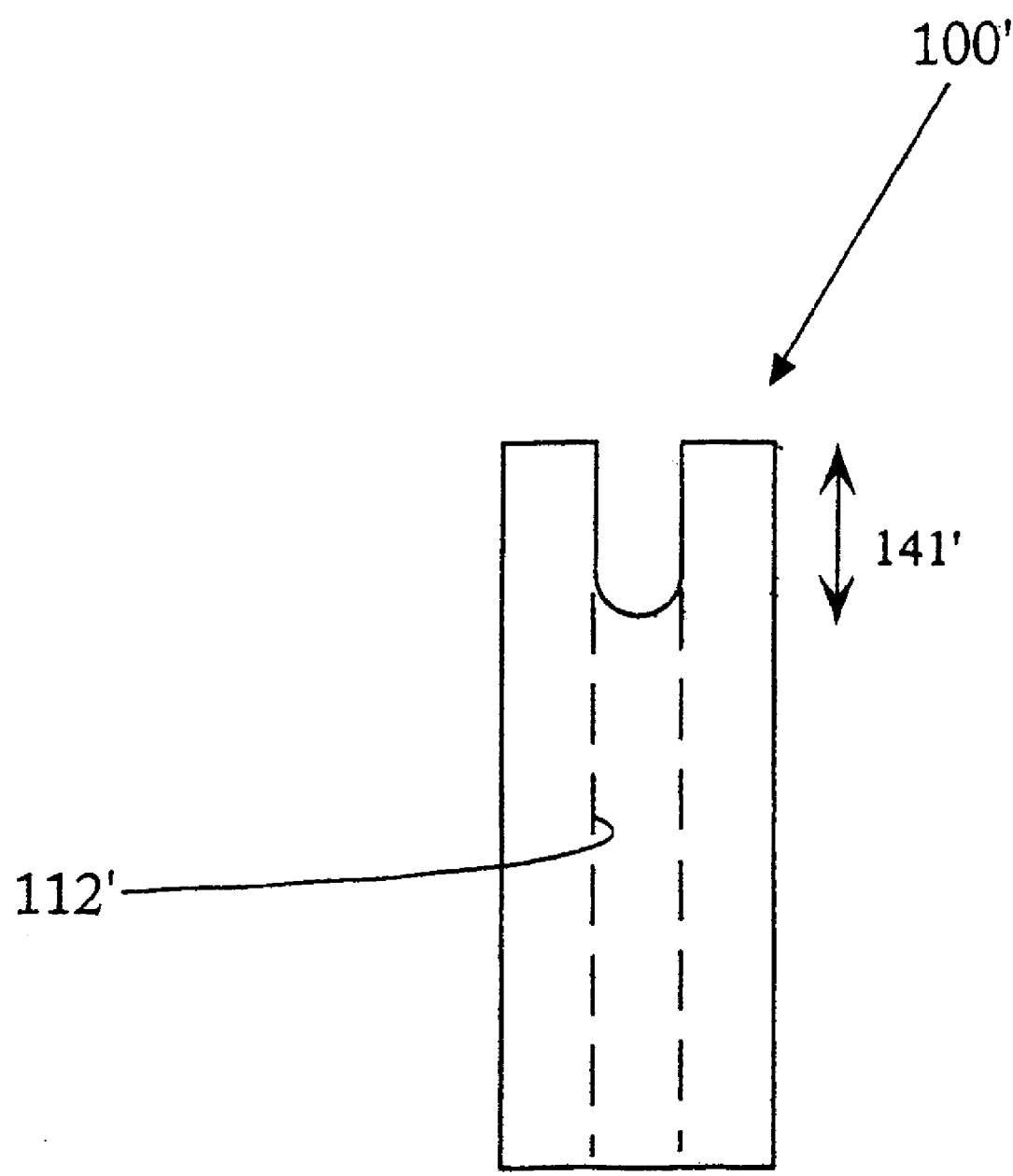
FIG. 6 is a side-view of a handheld computer for an alternative cover configuration, under another embodiment of the invention.

FIG. 6 illustrates handheld computer 100' having accessorial slot 112' with shortened open segments. Preferably, the accessorial slots 112' are positioned at or adjacent to one of the lateral sides of the handheld computer 100'. The open length 141' forming a portion of the accessorial slot 112' is relatively short in comparison to an overall length of the accessorial slot.

In another alternative embodiment, the cover 200 may include two elongate members coupled to two opposite edges of a cover panel. Both elongate members fit simultaneously into both accessory slots and hold cover panel 504 across the front of handheld computer 100.

In another alternative embodiment, cover panel 204 is formed from rigid materials such as used to form the spine 202. The cover panel 204 may, with flex member 206 and spine 202, be formed from a double-shot molding process combining rubber with a plastic shell. The cover panel 204 may be formed in the same manufacturing step as spine 202.

Alternatively, cover panel 204 may be formed from metals such as steel, aluminum, tin or brass. In these embodiments, cover panel 204 may be unitarily constructed with spine 202. Cover panel 204 may also be attached to spine 202 through flex member 206. The flex member 206 can be joined to spine 202 and cover panel 204 through mechanical coupling mechanisms.

D. Encasement for Handheld Computer

An embodiment of the invention includes an encasement that secures to and encases handheld computer 100. The encasement includes a structure that slideably engages the accessorial slot 112 of handheld computer 100. The encasement can be adapted to incorporate characteristics, features, and functions that protect handheld computer 100, as well as providing additional carriage or organizational uses.

As used herein, encasement refers to an enclosure that contains handheld computer within another structure so that a front and back surface of the handheld computer are covered. One or more lateral sides of the handheld computer may be exposed in an encasement. In addition, an encasement may include openings that access features or surfaces of the handheld computer 100.

FIG. 7A illustrate an interior of an encasement assembly 700 for handheld computer 100, under an embodiment of the invention. The encasement assembly 700 includes an encasement portion 750, referenced by a first segment 710 and a second segment 720. The first segment 710 and second segment 720 are moveable about a center axis Z of encasement portion 750.

A pair of retaining structures 725, 728 are centrally disposed on the interior surface 705 of encasement portion 750. The retaining structures 725, 728 are looped openings extending from the interior surface of the encasement portion 750. Preferably, retaining structures 725, 728 are aligned so that the openings are colinear.

In an embodiment such as shown by FIG. 7A, a spine 730 is separable from encasement portion 750. The spine 730 is a cylindrical member dimensioned to be retained within accessorial slot 112, 114. The retaining structures 725, 728 are colinearily aligned to retain spine 730.

In an embodiment, encasement assembly 700 is secured to handheld computer 100 by inserting spine 730 into retaining structures 720, 725. The spine 730 may then be inserted into accessorial slot 112, 114 of handheld computer 100. Portions of retaining structures 725, 728 may be extended out of the open segment 141 of accessorial slot 112 when spine 730 is inserted. In this way, encasement assembly 700 may be releasably coupled to handheld computer 100.

Further, spine 730 may be moveable about an arc length defined by open segment 141. Thus, encasement 700 may be moveable via spine 730 between a front and back surface of handheld computer 100.

The encasement assembly 700 encases handheld computer 100 when it is coupled to handheld computer 100. The encasement assembly 700 may provide additional retaining structures to retain a stylus of handheld computer 100. Alternatively, if handheld computer 100 includes more than one accessorial slots 112, 114, encasement assembly 700 may be coupled to one accessory also 112, and stylus 140 may be coupled to the other accessorial slot 114. Alternatively, the encasement assembly 700 may also include two spines 730 to insert into each respective accessorial slot 112, 114.

In an embodiment, spine 730 is the stylus for the handheld computer. The spine 730 may be separated and retained in one of the accessorial slots 112, 114 until used. When encasement assembly 700 is necessary, spine 730 may be inserted into retaining structures 725, 728. To provide stylus features, spine 730 may be equipped with a stylus point for touching the display of handheld computer 100.

The encasement portion 750 provides an interior surface or volume for retaining or providing items in addition to handheld computer 100. For example, FIG. 7A illustrates first segment 710 to include pockets 718 retaining items such as credit cards, business cards, smart cards, and memory units for handheld computer. The second segment 720 may include additional items such as stationary pad 716, or other items such as calculators.

FIG. 7A illustrates the encasement portion 750 in an open position, with first segment 710 and second segment 720 moved away from one another about the central axis. FIG. 7B illustrates the encasement structure 750 in the closed position, with the first segment 710 positioned adjacent to the second segment 720. As shown by FIG. 7B, retaining structures 725, 728 (in phantom) may extend away from the interior surface of the encasement portion 750. This provides retaining structures 725, 728 with clearance to retain spine 730, and to allow spine 730 to insert in accessorial slot 112 of handheld computer 100. It also enhances the moveability of the encasement 700 about the spine 730.

FIG. 8 illustrates another embodiment for an encasement 800. The encasement 800 includes an encasement portion 850, referenced by a first segment 810 and a second segment 820. As with previous embodiments, the first segment 810 and the second segment 820 are moveable about a central axis Z of the encasement portion 850.

The encasement 800 includes one or more spine segments 830, 835 integrated with an interior surface 805 of encasement portion 850. The spine segments 830, 835 may be secured to an interior surface 805 of first segment 810, second segment 830, or centrally disposed on encasement portion 850. For example, spine segments 830, 835 may be formed from plastic, integrated with a flap portion (not shown) during a molding process. The flap portion of spine segments 830, 835 may be stitched or otherwise secured to the interior surface 805 of encasement portion 850.

To insert encasement portion 850, spine segments 830, 835 are inserted into accessorial slot 112. For example, encasement 800 may be aligned with the top surface of handheld computer so that bottom spine segment 835 engages accessorial slot 112 first, followed by top spine segment 830. While encasement 800 is shown to include separated spine segments 830, 835, other embodiments may provide for a single spine (such as shown by FIGS. 7A and 7B) that is integrated with the encasement portion 850.

With respect to embodiments of FIGS. 7–9, the encasement may be formed from flexible or compliant material. For example, the encasement may be formed from leather or leather like material, vinyl, fabric, or rubber. The spine may be formed from rigid material, such as plastic or metal.

Figure 9A:
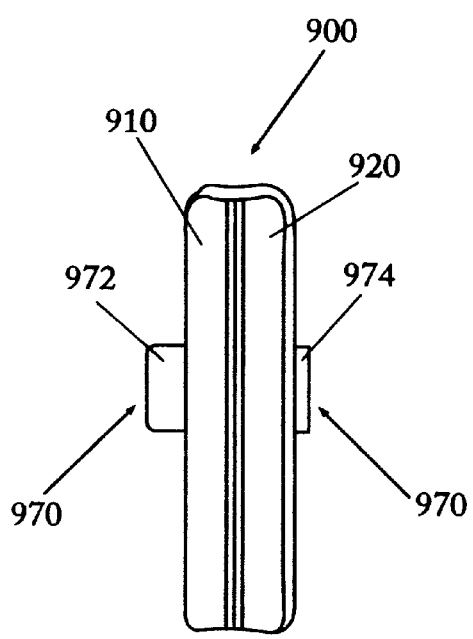
FIGS. 9A–9B illustrate mechanical couplings for encasements, under an embodiment of the invention.
Figure 9B:
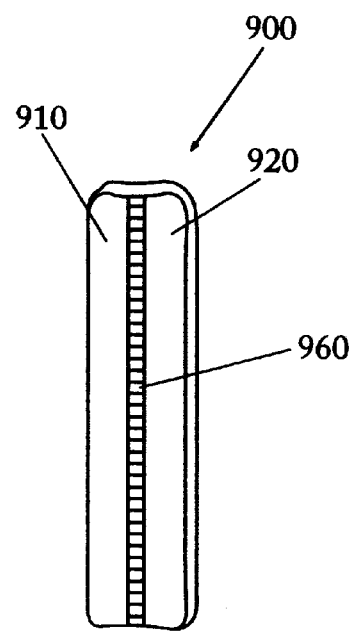

FIGS. 9A and 9B illustrate embodiments illustrating different mechanism for securing an encasement 900 in a closed position. The encasement 900 may be similar to embodiments such as described with FIGS. 7A, 7B and 8. The encasement 900 includes first segment 910 and second segment 920. The first segment 910 and second segment 920 may be secured together by a mechanical coupling. When secured together, the first and second segments 910 and 920 extend over the front and back surface of handheld computer 100, thereby encasing the handheld computer 100.

FIG. 9A illustrates a zipper mechanism 960 for retaining the first segment 910 against the second segment 920. In an embodiment, a male zipper strip is provided on a peripheral edge of either the first or second segment 910, 920, and a female zipper element is provided on a peripheral edge of the other segment.

FIG. 9B illustrates encasement 900 including a clasp mechanism 970 for retaining encasement 900 in a closed position. The clasp element 970 may include a button element 972 (male element) and button receiver 974 (female element). Alternatively, the clasp element may be a Velcro™ fastener, with male clasp 972 and female clasp 974. Many other types of mechanical couplings are contemplated for retaining the encasement 900 in the closed position.

Figure 10A:
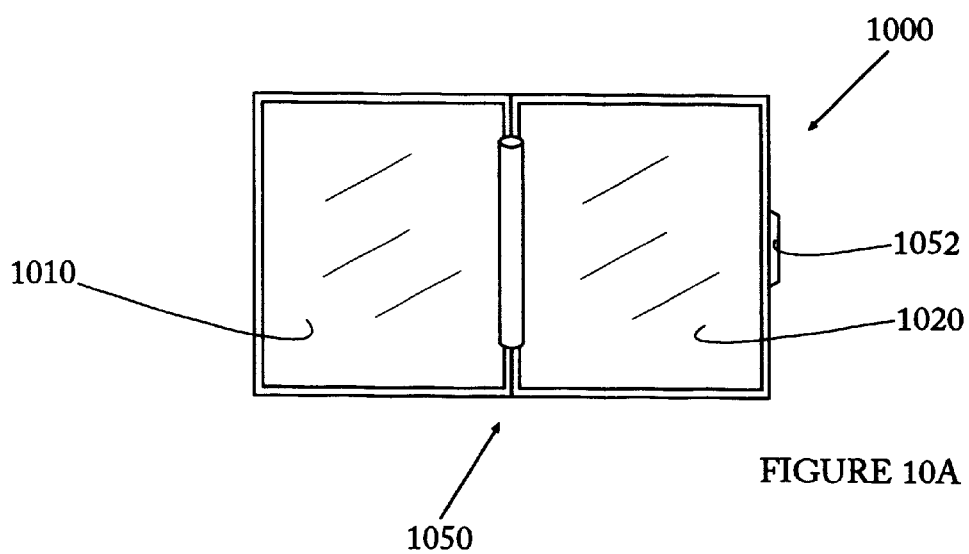
FIGS. 10A–10D illustrate an encasement having a hard-shell exterior, under an embodiment of the invention.
Figure 10B:
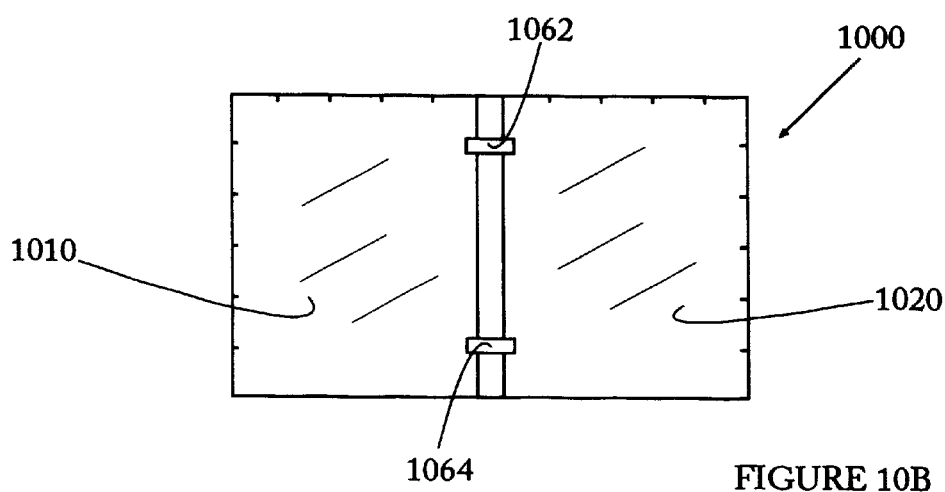
Figure 10C:
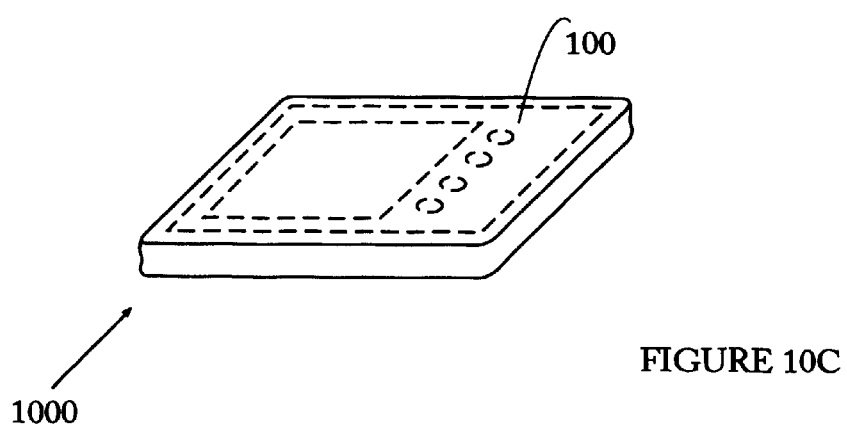

FIGS. 10A–10C illustrates a hard-shell encasement 1000 for retaining handheld computer 100. The encasement 1000 includes an encasement portion 1050 comprising a first segment 1010 and second segment 1020. The first segment 1010 and/or second segment 1020 are formed from rigid materials. For example, encasement portion 1050 may be formed from metals such as steel and aluminum, plastic, or titanium.

FIG. 10A illustrates an interior of the encasement 1000 in an open position. The first segment 1010 and second segment 1020 may pivot away from each other about a central axis Z. A spine 1030 may be integrated to extend lengthwise between the first and second segment 1010 and 1020. As with previous embodiments, spine 1030 inserts into one of the accessorial slots 112, 114 of handheld computer 100.

Once inserted, a portion of the spine 1030 integrated with encasement portion 1050 may extend from the accessorial slot 112 through open segment 141, thereby securing encasement 1000 to handheld computer 100. The first and/or second segments 1010, 1020 include mechanical couplings 1052 to secure the encasement 1000 in the closed position. In an embodiment, the mechanical coupling is a latch element.

FIG. 10B illustrates an exterior of the encasement 1000 in the open position. The encasement includes one or more joints 1062, 1064 to enable the first and second segments 1010, 1020 to rotate between open and closed positions.

FIG. 10C illustrates the encasement 1000 in the closed position, with handheld computer 100 (shown in phantom) retained therein. In an embodiment, handheld computer 100 is carried within encasement 1000 by inserting spine 1030 into accessorial slot 112. However, the dimensions of encasement 1000 may permit handheld computer 100 to be retained within encasement portion 1050 without spine 1030 being inserted into accessorial slot 112.

In an embodiment, encasement 1000 includes interior shock-absorbers or cushion material to protect handheld computer 100 from contact with the rigid interior walls. In this way, handheld computer 100 may be protected from impact and carried in more harsh environments, such as for field use.

Figure 10D:
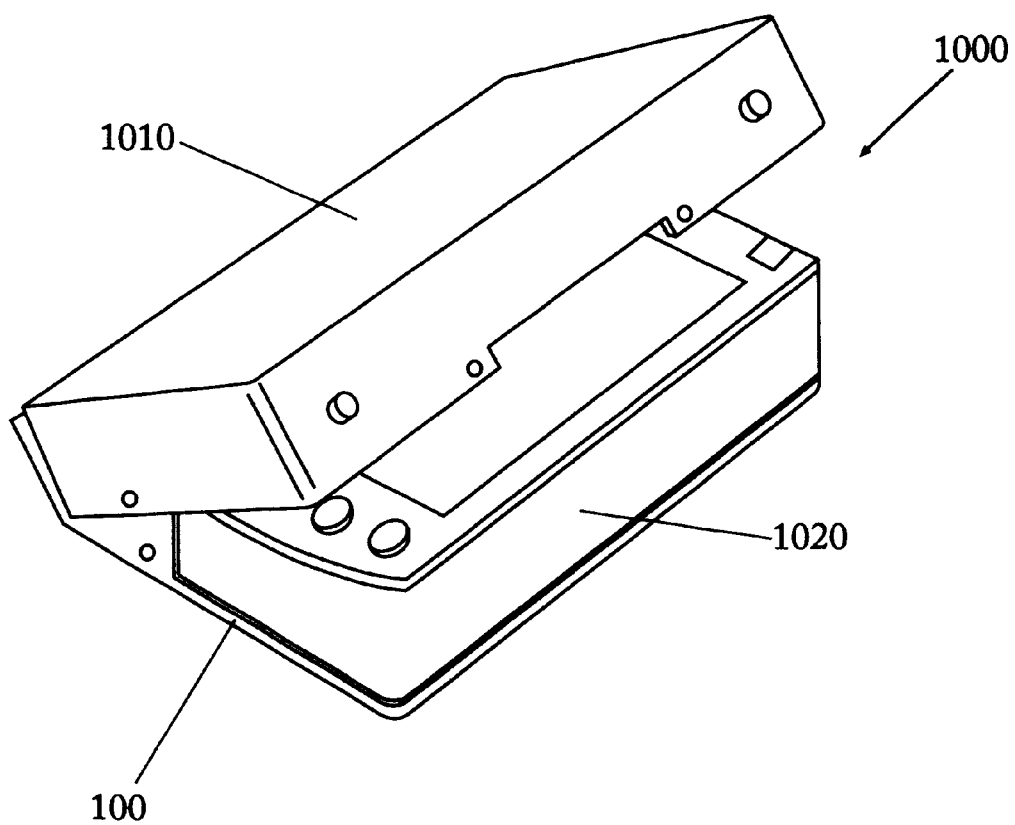

FIG. 10D is an isometric view of encasement 1000 in a partially open position. The first segment 1010 may be pivoted away from the second segment 1020 in opening the encasement 1000.

Figure 11A:
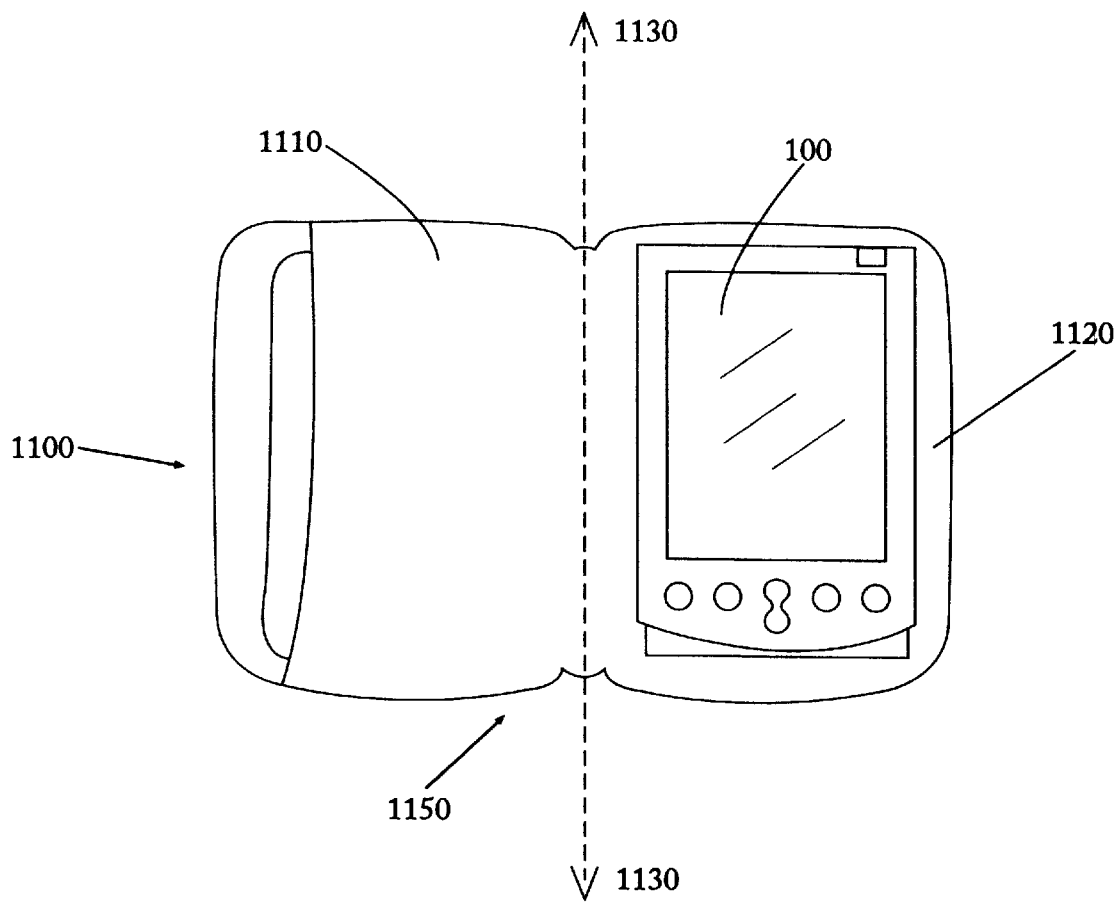
FIGS. 11A–11B illustrate the encasement formed from water-resistant material, under an embodiment of the invention.
Figure 11B:
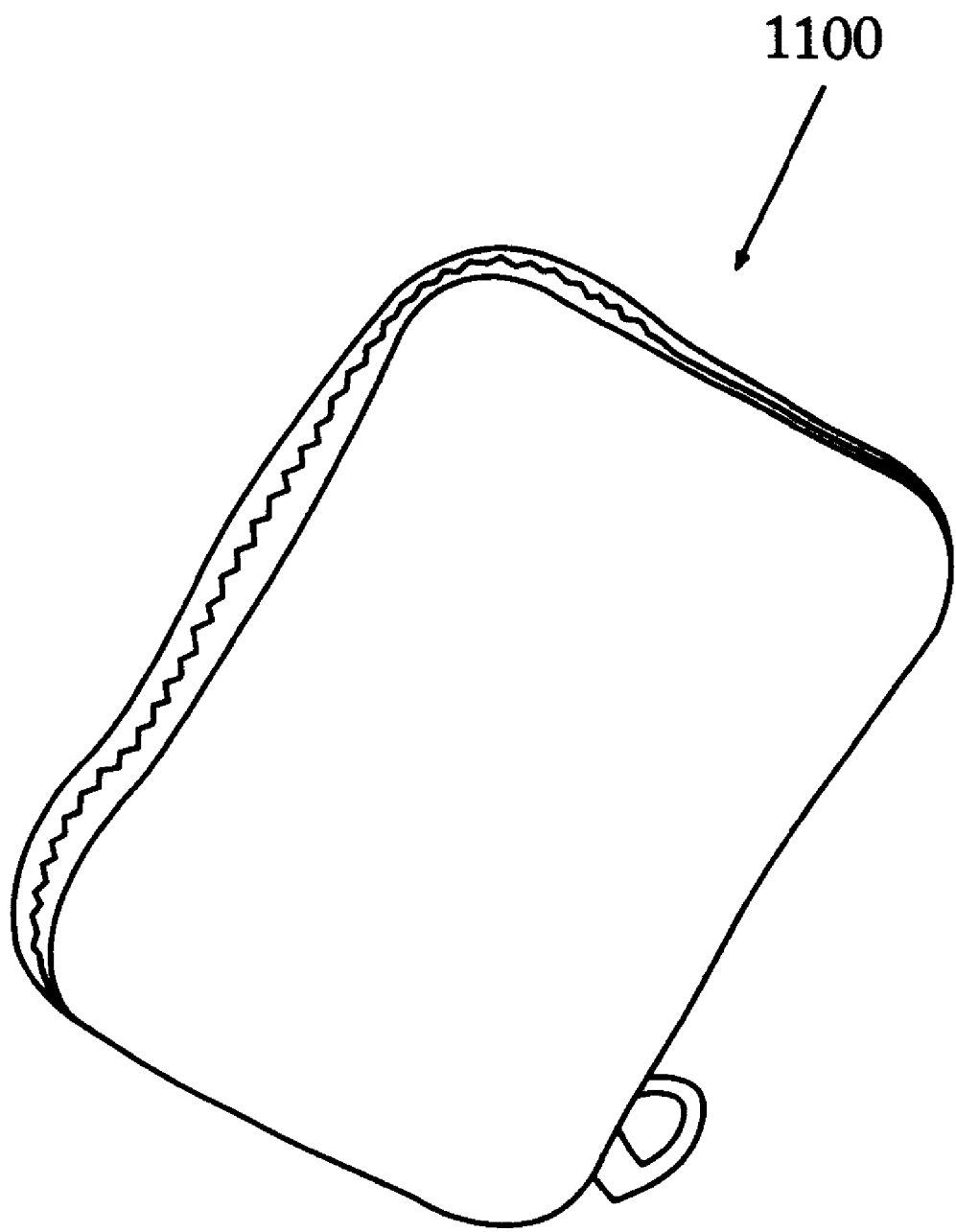

FIG. 11A illustrates an encasement 1100 in an open position, under another embodiment of the invention. The encasement 1100 includes encasement portion 1150. The encasement portion 1150 includes a first encasement segment 1110 that is pivotal bout an axis Z with reference to a second encasement segment 1120. The encasement 11000 includes spine, shown by directional arrow 1130. The spine 1130 is inserted into handheld computer 100 to retain the handheld computer with the encasement 1100. A zipper 1160 secures the first segment against the second segment to encase handheld computer 100. FIG. 11B illustrates the encasement 1100 in the closed position.

In an embodiment, encasement 1100 is formed from water-resistant material. For example, encasement 1150 may be formed from neoprene, or comparable materials. An interior of encasement 1150 adjacent zipper 1160 may be lined with water-resistant material. In the closed position, handheld computer 100 may be sealed from water in the environment, thus being protected from rain, puddles or submersion.

Figure 12A:
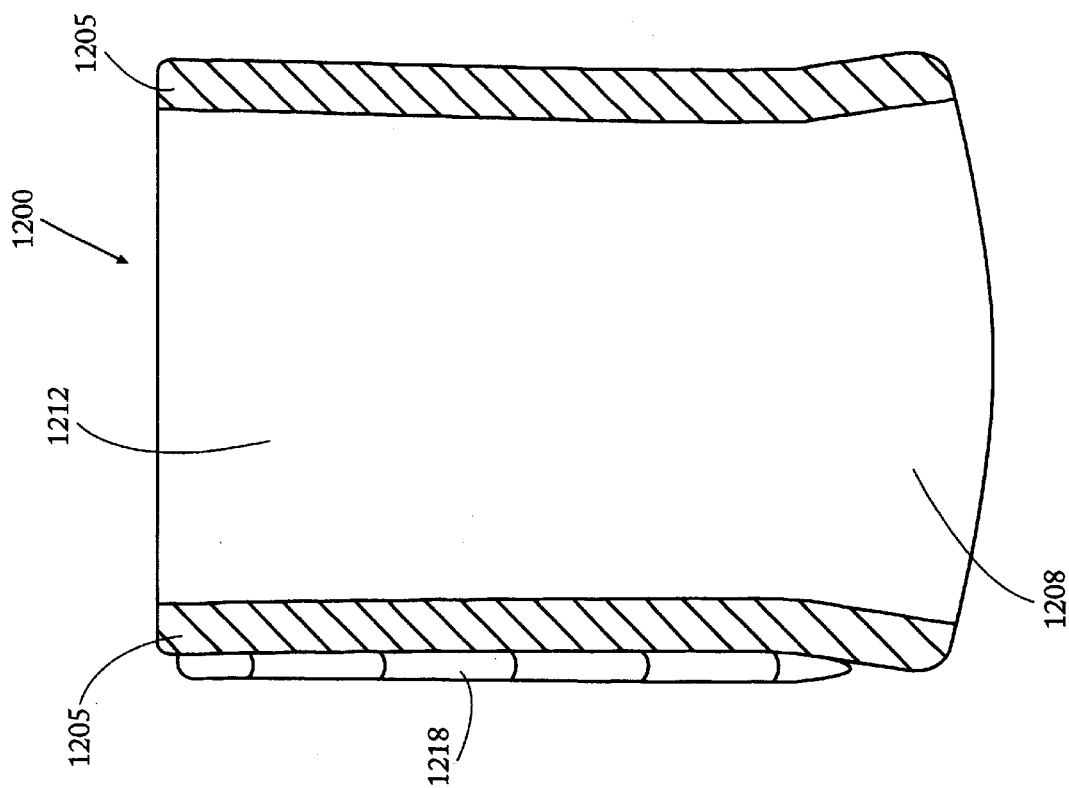
FIGS. 12A–12F illustrates another embodiment of a hard-shell encasement, under and embodiment of the invention.

FIGS. 12A–12E illustrate a hard-shell encasement 1200, under an embodiment of the invention. FIG. 12A illustrates a front surface 1212 of the encasement 1200. The encasement 1200 includes a joint 1218. The joint 1218 allows the front surface to pivot away from a back surface of the encasement 1200, in a direction coming out of the paper.

In an embodiment, the encasement 1200 is formed from a combination of rigid materials. The encasement 1200 may provide on front surface 1212 a plastic portion 1205 combined with a metal or metal like portion 1208. The plastic portion 1205 may be formed during a molding process. In an embodiment, encasement 1200 is formed by combining the metal portion 1208 with a skeleton of molded plastic.

Figure 12D:
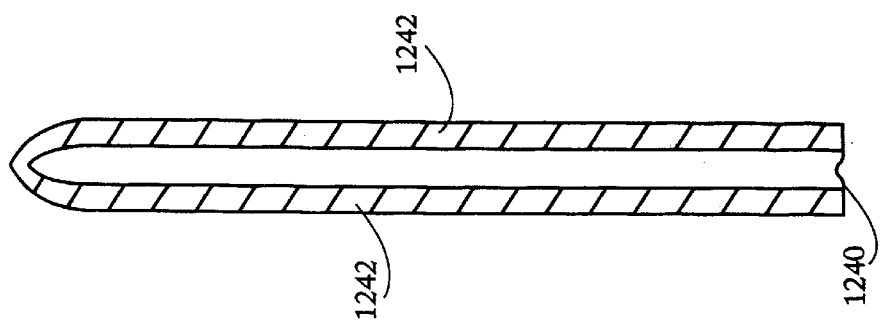
Figure 12B:
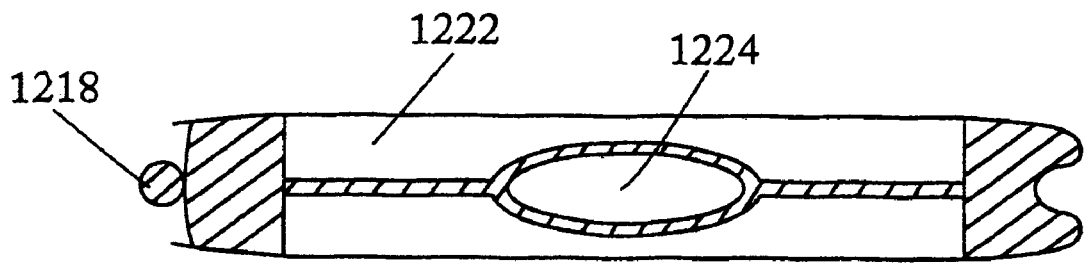

FIG. 12B is a top view showing a top surface 1222 of the encasement 1200. The surface 1222 includes an opening 1224. In an embodiment, opening 1224 is positioned to allow access to a data port of the handheld computer. Preferably, the opening 1224 is positioned to provide access to a wireless port of the handheld computer 100. For example, the opening 1224 is positioned to provide access to an infra-red port of the handheld computer 100. Thus, handheld computer 100 can receive wireless signals from other devices even when housed within encasement 1200. This provides convenience to users, who can receive, for example, electronically transmitted business cards from other devices without having to remove the handheld computer 100 from encasement 1200.

The plastic portion 1205 extends to the top surface 1222 and to opening 1224. The joint 1218 is also formed from plastic and is integrated to the plastic portion on one of the lateral sides of encasement 1200.

While FIG. 12B illustrates opening 1224 positioned to provide wireless access to a top surface of handheld computer 100, other embodiments may position the opening 1224 according to the position of the data port on another type of handheld computer 100.

Figure 12C:
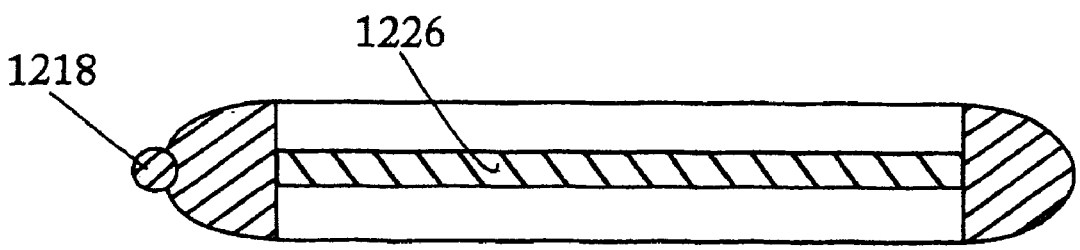

FIG. 12C illustrates a bottom surface 1226 of encasement 1200. The metal portion 1208 combines with plastic portion 1205 to extend in curved fashion to the bottom surface 1226. The contours of the bottom surface 1226 matches contours on handheld computer 100.

FIG. 12D is a side-view of encasement 1200, under an embodiment. The encasement 1200 includes a lateral surface 1242 having a slot 1240. The slot 1240 is positioned to match either open segment 141, 143 of respective accessory slot 112, 114. The slot 1240 is dimensioned to allow a stylus to insert and be received by accessory slot 112, 114 when handheld computer 100 is retained by encasement 1200.

Figure 12E:
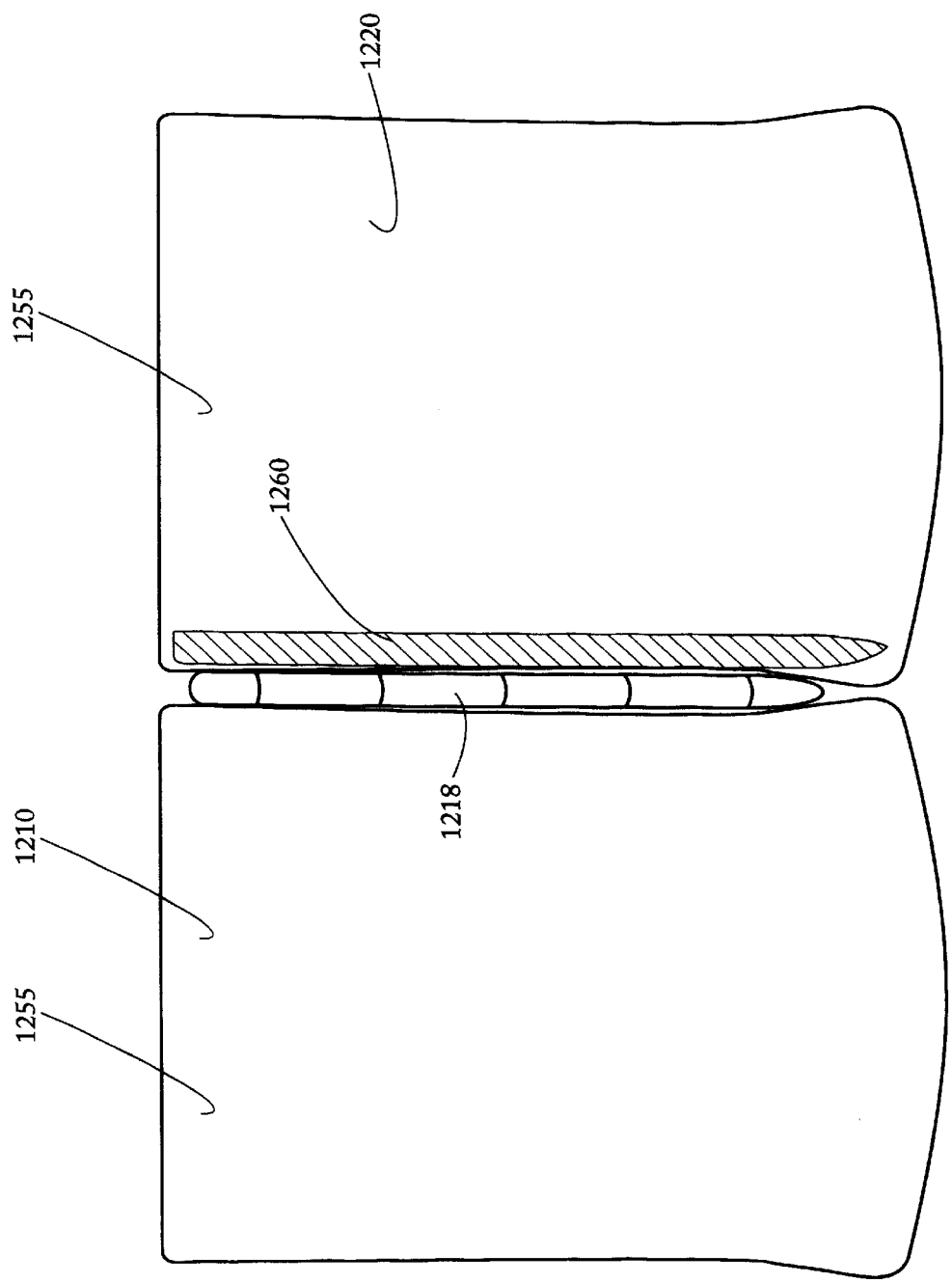

FIG. 12E illustrates the encasement in an open position. The encasement 1200 includes a first segment 1210 and a second segment 1220. The joint 1218 is positioned between the first and second segment. The joint 1218 enables either first or second segment 1210 or 1220 to rotate about a center axis Z.

In an embodiment, a spine 1260 is positioned towards a middle region of the encasement 1200, adjacent to joint 1218. The spine 1260 may be off-center with respect to central axis Z. The spine 1260 is dimensioned to be received by either accessory slot 112, 114 of handheld computer 100.

As shown by FIGS. 12D and 12E, the spine 1260 of encasement 1200 may be inserted into one of the accessory slots 112, 114 of handheld computer. When inserted and in the closed position, the slot 1240 provides access to the other of the accessory slots 112, 114 of handheld computer 100. Thus, access can be provided to a stylus retained in one of the accessory slots 112, 114 even when handheld computer 100 is retained within the encasement 1200. This is especially advantageous when the stylus includes writing features, such as a ball-point tip.

Figure 12F:
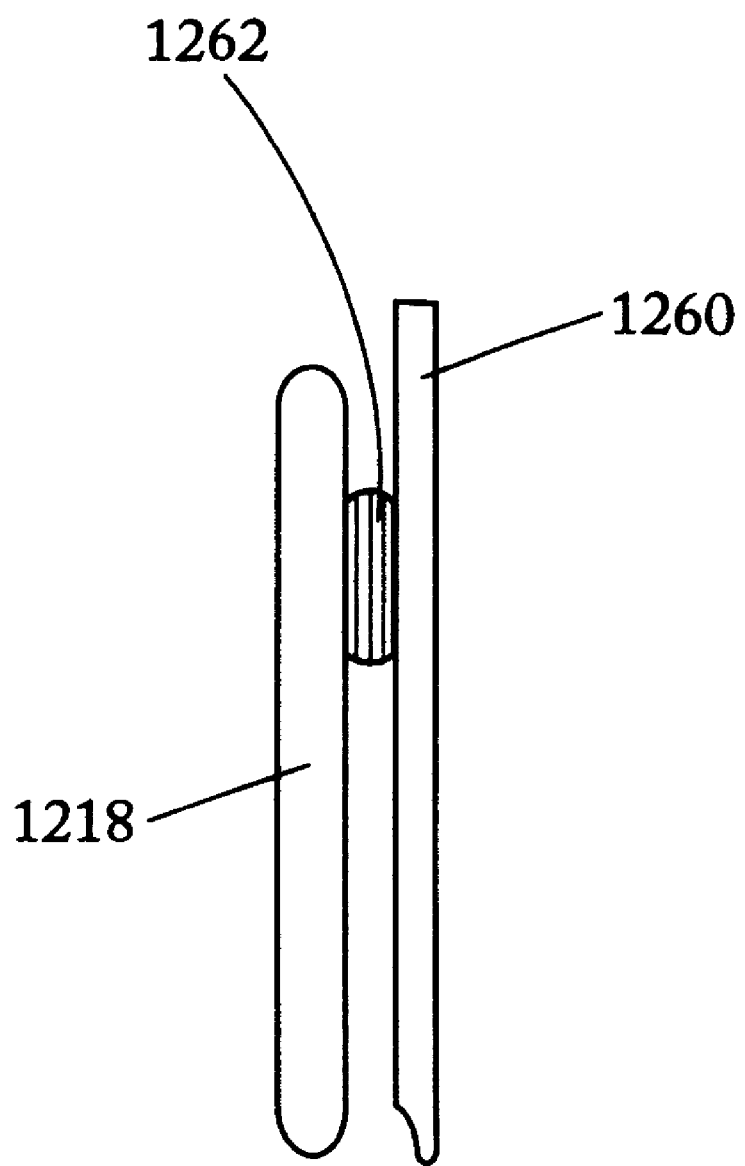

FIG. 12F is a side cut-away of encasement 1200 in the open position, showing spine 1260 distended from joint 1218. An extension 1262 is provided between joint 1218 and spine 1260 so that spine 1260 can extend out of the open segment 141 of accessory slot 112. In an embodiment, spine 1260 and joint 1218 are formed from the same material, preferably integrated plastic.

Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. An encasement for a handheld computer, the encasement comprising:
   a spine that is slideably engageable with an accessory slot of a handheld computer; and
   an encasement portion joined to the spine, the encasement portion being dimensioned to encase the handheld computer when the spine is engaged to the handheld computer.

2. The encasement of claim 1, wherein the encasement portion is formed from flexible material.

3. The encasement of claim 2, wherein the encasement portion includes a first segment that extends over a front surface of the handheld computer, and a second segment that extends over a back surface of the handheld computer, the first segment and the second segment being moveably joined to the spine so as to move between an open position and a closed position, the front surface of the handheld computer being accessible when the first segment and the second segment are in the open position, and the front surface of the handheld computer being encased when the first segment and the second segment are in the closed position.

4. The encasement of claim 1, further comprising a mechanical coupling, the mechanical coupling enabling the first segment and the second segment to be retained in the closed position.

5. The encasement of claim 4, wherein the mechanical coupling includes a female zipper strip that extends a lengthwise segment of one of the first segment or the second segment, and a male zipper strip that extends a lengthwise segment of the other of the first segment or the second segment.

6. The encasement of claim 5, wherein the mechanical coupling is a male velcro element positioned on one of the first segment or the second segment and a female velcro element positioned on the other of the first segment or second segment.

7. The encasement of claim 1, wherein the encasement portion is formed from a rigid material.

8. The encasement of claim 1, wherein upon the encasement being engaged with the handheld computer, a first segment of the encasement extends over a front surface of the handheld computer, and a second segment of the encasement extends over a back surface of the handheld computer, the first segment being hinged to the second segment.

9. The encasement of claim of claim 3, wherein an interior surface of the first segment or the second segment is provided one or more pockets.

10. The encasement of claim 3, wherein an interior surface of the first segment or the second segment is provided a vinyl enclosure having dimensions for retaining a business card.

11. The encasement of claim 9, wherein the encasement portion comprises a leather material.

12. The encasement of claim 1, wherein the spine insert into an accessory slot of the handheld computer.

13. The encasement of claim 12, wherein the spine is dimensioned to be received by a slot of the handheld computer, the slot being adapted to receive a stylus of the handheld computer.

14. An encasement assembly for a handheld computer, the encasement assembly comprising:
   a spine that is slideably insertable into an accessory slot of a handheld computer; and
   an encasement portion including a middle region, the middle region containing one or more structures to releaseably retain the spine, the one or more structures being configured so that the spine is insertable into the accessory slot of the handheld computer when the spine is received by the one or more structures.

15. The encasement assembly of claim 12, wherein the spine is formed from a rigid material, and the encasement portion is formed from a flexible material.

16. The encasement assembly of claim 12, wherein each of the one or more structures are looped extensions forming an opening, the one or more structures being aligned in the middle region so that the openings are colinear.

17. An encasement for a handheld computer, the encasement comprising:
   an encasement portion dimensioned so as to be able to encase the handheld computer, the encasement portion comprising a water-resistant material; and
   a spine positioned on an interior region of the encasement portion, the spine being slideably engageable with an accessory slot of a handheld computer to couple the encasement portion with the handheld computer.

18. The encasement of claim 17, wherein the encasement portion comprises a neoprene material.

19. The encasement of claim 15, wherein the encasement portion comprises a first segment that encases a front region of the handheld computer having a display, and a second segment that encases a back region of the handheld computer, the first segment and the second segment being moveably joined to the spine so as to move between an open position that accesses the handheld computer and a closed position that encases the handheld computer.

20. The encasement of claim 16, further comprising a mechanical coupling that secures the first segment to the second segment when the first and second segment are in the closed position.

21. The encasement of claim 15, wherein the mechanical coupling includes a female zipper strip that extends a lengthwise segment of one of the first segment or the second segment, and a male zipper strip that extends a lengthwise segment of the other of the first segment or the second segment, wherein a seal formed by the mechanical coupling is water resistant.

22. An encasement for a handheld computer, the encasement comprising:
   an encasement portion dimensioned so as to be able to encase the handheld computer, the encasement including an opening aligned to access a wireless port of the handheld computer when the handheld computer is contained within the encasement; and
   a spine positioned on an interior region of the encasement portion, the spine being slideably engageable with an accessory slot of a handheld computer to couple the encasement portion with the handheld computer.

23. The encasement of claim 22, wherein the opening is positioned on a surface of the encasement portion that is aligned orthanormally to a front surface or back surface of the handheld computer.

24. The encasement of claim 22, wherein the encasement portion includes a first segment that covers a front surface of the handheld computer, and a second segment that covers a back surface of the handheld computer, the encasement further comprising a joint that enables the first segment to rotate with respect to the second segment.

25. The encasement of claim 24, wherein the joint is positioned adjacent to the spine.

26. An encasement for a handheld computer, the encasement comprising:

a spine that is insertable with an accessory slot of a handheld computer;

an encasement portion joined to the spine, the encasement portion being dimensioned to encase the handheld computer when the spine is engaged to the handheld computer, the encasement portion including a first segment and a second segment that are moveably joined to the spine, the first segment and second segment being moveable between an open position and a closed position; and a means for retaining the first segment to the second segment of the encasement portion so as to enclose the handheld computer within the encasement when the spine is inserted into the accessory slot of the handheld computer.

* * * * *